(12) United States Patent
Liu et al.

(10) Patent No.: US 11,539,296 B2
(45) Date of Patent: Dec. 27, 2022

(54) HYBRID POWER CONVERSION SYSTEM AND CONTROL METHOD

(71) Applicant: Halo Microelectronics International, Campbell, CA (US)

(72) Inventors: Thomas Liu, Freemont, CA (US); Songnan Yang, Frisco, TX (US)

(73) Assignee: Halo Microelectronics International, Campbell, CA (US)

( * ) Notice: Subject to any disclaimer, the term of this patent is extended or adjusted under 35 U.S.C. 154(b) by 0 days.

(21) Appl. No.: 17/510,945

(22) Filed: Oct. 26, 2021

(65) Prior Publication Data
US 2022/0376625 A1 Nov. 24, 2022

Related U.S. Application Data

(63) Continuation-in-part of application No. 17/326,503, filed on May 21, 2021, now Pat. No. 11,451,151.

(51) Int. Cl.
*H02M 3/158* (2006.01)
*H02M 3/07* (2006.01)
*H02M 1/00* (2006.01)

(52) U.S. Cl.
CPC ....... *H02M 3/1584* (2013.01); *H02M 1/0095* (2021.05); *H02M 3/07* (2013.01)

(58) Field of Classification Search
CPC ..... H02M 3/07; H02M 3/1584; H02M 1/0095
See application file for complete search history.

(56) References Cited

U.S. PATENT DOCUMENTS

| | | | |
|---|---|---|---|
| 7,397,299 B2 | 7/2008 | Ki et al. | |
| 8,860,396 B2 | 10/2014 | Giuliano | |
| 2015/0077073 A1 | 3/2015 | Yu et al. | |
| 2015/0263612 A1 | 9/2015 | Wu et al. | |
| 2016/0344214 A1 | 11/2016 | Petersen et al. | |
| 2017/0244318 A1 | 8/2017 | Giuliano | |
| 2017/0324326 A1 | 11/2017 | Liu et al. | |
| 2019/0372457 A1 | 12/2019 | Zhang et al. | |
| 2020/0036286 A1* | 1/2020 | Giuliano | H02M 1/42 |
| 2020/0169170 A1 | 5/2020 | Zhang | |
| 2020/0212704 A1 | 7/2020 | Eftimie | |
| 2021/0075323 A1 | 3/2021 | Jin et al. | |

FOREIGN PATENT DOCUMENTS

| | | |
|---|---|---|
| CN | 107395010 A | 11/2017 |
| CN | 109742949 A | 5/2019 |
| CN | 208820683 U | 5/2019 |
| CN | 110098740 A | 8/2019 |
| CN | 110247546 A | 9/2019 |
| CN | 209948954 U | 1/2020 |

(Continued)

*Primary Examiner* — Jue Zhang
(74) *Attorney, Agent, or Firm* — Slater Matsil, LLP

(57) ABSTRACT

A hybrid dual-phase step-up power conversion system includes a step-up converter apparatus comprising a first leg, a second leg, a first capacitor and a second capacitor, wherein the first capacitor and the second capacitor are cross-coupled between the first leg and the second leg, and a plurality of expansion circuits coupled to the step-up converter apparatus, wherein the plurality of expansion circuits is configured to increase a power conversion ratio of the hybrid dual-phase step-up power conversion system.

21 Claims, 18 Drawing Sheets

(56) References Cited

FOREIGN PATENT DOCUMENTS

| | | |
|---|---|---|
| CN | 209948956 U | 1/2020 |
| CN | 112737144 A | 4/2021 |
| CN | 113328628 A | 8/2021 |
| CN | 113572242 A | 10/2021 |
| CN | 114006547 A | 2/2022 |
| WO | 2007148354 A1 | 12/2007 |

* cited by examiner

Providing a hybrid dual-phase step-up power conversion system comprising a first leg and a second leg comprising a plurality of switches, a first capacitor and a second capacitor cross-coupled between the first leg and the second leg ⸺ 1002

In a first operating mode of the hybrid dual-phase step-up power conversion system, configuring the plurality of switches of the first leg and the second leg such that the second capacitor and the first capacitor are connected in series between an output of the hybrid dual-phase step-up power conversion system and ground ⸺ 1004

In a second operating mode of the hybrid dual-phase step-up power conversion system, configuring the plurality of switches of the first leg and the second leg such that the first capacitor and the second capacitor are connected in series between the output of the hybrid dual-phase step-up power conversion system and ground ⸺ 1006

Figure 10

HYBRID POWER CONVERSION SYSTEM AND CONTROL METHOD

PRIORITY CLAIM AND CROSS-REFERENCE

This application is a continuation-in-part of U.S. patent application Ser. No. 17/326,503, filed May 21, 2021, and entitled "Hybrid Power Conversion System and Control Method," which application is hereby incorporated herein by reference.

TECHNICAL FIELD

The present invention relates to a hybrid power conversion system, and, in particular embodiments, to a hybrid dual-phase step-up power conversion system.

BACKGROUND

As technologies further advance, a variety of portable devices, such as mobile phones, tablet PCs, digital cameras, MP3 players and/or the like, have become popular. Batteries provide power for various high voltage applications such as display backlights, audio amplifiers, piezoelectric haptic actuators and the like. For example, each portable device may comprise a Liquid Crystal Display (LCD). The LCD does not emit light by itself. The LCD needs a backlight to provide illumination so as to produce a visible image. The backlight may be formed by a plurality of light-emitting diodes (LEDs). Each LED typically requires 3.3 V to emit light. Depending on the number of the LEDs, the backlight may need a supply voltage up to 20 V. A boost converter may be coupled between a power source (e.g., a battery) and a high voltage load (e.g., a backlight comprising a plurality of LEDs). The boost converter is configured to convert a source voltage (e.g., the output voltage of a battery cell) to a level (e.g., 20 V) suitable for driving the plurality of LEDs.

A conventional boost converter comprises a switching element, a blocking device, an energy storage element and an output filter. The switching element may be implemented as a metal—oxide—semiconductor field-effect transistor (MOSFET). The blocking device may be implemented as a diode. The energy storage element may be implemented as an inductor. The output filter may be implemented as a capacitor. The diode and the MOSFET are connected in series across the capacitor. The inductor is coupled between an input power source and the common node of the diode and the MOSFET transistor. The conventional boost converter is used to provide an output voltage higher than an input voltage from the input power source by modulating the width of a pulse applied to the MOSFET.

In the portable device, the power source may be implemented as a single-cell battery. In order to achieve an output voltage approximately equal to 20 V, the step-up ratio of the conventional boost converter should be 1:4 or higher. Such a high step-up ratio makes it more difficult to achieve the desired efficiency using the conventional boost converter.

A cascaded power conversion system may be employed to achieve better efficiency. The cascaded power conversion system comprises a boost converter and a charge pump converter connected in cascade. The boost converter can adjust its output voltage by varying the duty cycle of the boost converter. The charge pump converter is able to achieve a step-up ratio of 1:2.

FIG. 1 illustrates a single-phase step-up power conversion system. The single-phase step-up power conversion system 100 comprises an input capacitor 101, an input inductor 102, power switches 103, 104, 105, 106, a first capacitor 107, a second capacitor 108, an output capacitor 109 and a single-phase step-up controller 120. The power switches 103-106 are connected in series between an output terminal Vo and ground. The input capacitor 101 is connected between an input terminal VIN and ground. The input inductor 102 is connected between VIN and a common node of switches 103 and 104. The first capacitor 107 is connected between a common node of switches 105 and 106, and the common node of switches 103 and 104. The second capacitor 108 is connected between a common node of switches 104 and 105, and ground. The single-phase step-up controller 120 is configured to generate gate drive signals applied to the gates of switches 103-106, respectively.

In FIG. 1, the input capacitor 101, the input inductor 102, power switches 103, 104 and the second capacitor 108 form a boost converter. The capacitors 107-109 and power switches 103-106 form a 1:2 step-up charge pump converter. Since the output voltage across the output capacitor 109 is equal to twice of the voltage across the second capacitor 108, which is also the output voltage of the boost converter, the output voltage Vo of the single-phase step-up power conversion system 100 is at least two times higher than the input voltage VIN.

FIG. 2 illustrates gate drive signals associated with the single-phase step-up power conversion system shown in FIG. 1. As shown in FIG. 2, power switches 103 and 105 are turned on (e.g., from t1 to t2) and off (e.g., from t2 to t3) at the same time. Likewise, power switches 104 and 106 are on and off at the same time. In addition, power switches 103 and 104 operate in a complimentary manner. Likewise, power switches 105 and 106 operate in a complimentary manner. By varying the duty cycle of power switch 103, the output voltage can be more than twice of the input voltage. For example, the duty cycle is 50%, the output voltage is four times of the input voltage. It should be noted that in a conventional boost converter, a duty cycle of 50% results in an output voltage equal to twice of the input voltage. Furthermore, with the same output voltage, a higher duty cycle of power switch 103 results in a lower root mean square (RMS) current and power dissipation, thereby achieving higher efficiency. One disadvantage of the single-phase step-up power conversion system shown in FIG. 1 is that ripple currents of capacitors 101, 108, and 109 are high, resulting additional power losses in these capacitors. To reduce the power dissipation of these capacitors, a dual-phase step-up power conversion system is used.

FIG. 3 illustrates a dual-phase step-up power conversion system. The dual-phase step-up power conversion system 200 comprises an input capacitor 201, a first input inductor 211, a second input inductor 221, power switches 212, 213, 214, 215, power switches 222, 223, 224, 225, a first capacitor 216, a second capacitor 217, a third capacitor 202, an output capacitor 203 and a dual-phase step-up controller 230.

The power switches 212-215 are connected in series between an output terminal Vo and ground. The power switches 222-225 are connected in series between an output terminal Vo and ground. The input capacitor 201 is connected between an input terminal VIN and ground. The first input inductor 211 is connected between VIN and a common node of switches 213 and 212. The first capacitor 216 is connected between a common node of switches 215 and 214, and the common node of switches 213 and 212. The second input inductor 221 is connected between VIN and a common node of switches 223 and 222. The second capacitor 217 is connected between a common node of switches 225 and 224, and the common node of switches 223 and 222. The third capacitor 202 is connected between a common node of switches 214 and 213, and ground. The common node of switches 224 and 223 is connected to the common node of switches 214 and 213. The dual-phase step-up controller 230 is configured to generate gate drive signals applied to the gates of switches 212-215 and switches 222-225, respectively.

In FIG. 3, the input capacitor 201, the first input inductor 211, power switches 213, 212 and the third capacitor 202 form a first boost converter. The capacitors 202, 216, 203 and power switches 212-215 form a first 1:2 step-up charge pump. The first boost converter and the first 1:2 step-up charge pump form a first phase of the dual-phase step-up power conversion system 200. The input capacitor 201, the second input inductor 221, power switches 223, 222 and the third capacitor 202 form a second boost converter. The capacitors 202, 217, 203 and power switches 222-225 form a second 1:2 step-up charge pump. The second boost converter and the second 1:2 step-up charge pump form a second phase of the dual-phase step-up power conversion system 200. In FIG. 3, capacitors 201, 202, and 203 are shared between the two boost converters and the two 1:2 step-up charger pumps.

FIG. 4 illustrates gate drive signals associated with the dual-phase step-up power conversion system shown in FIG. 3. The operating principle of the power switches in FIG. 4 is similar to that shown in FIG. 2 except that the two phases shown in FIG. 4 are configured to be out of phase from each other. For example, the switch 212 of the first phase is turned on from a first time instant t1 and a second time instant t2. By employing the out of phase control, the corresponding switch of the second phase (e.g., switch 222) is turned on from a third time instant t3 and a fourth time instant t4 Likewise, the switch 212 is turned off from the second time instant t2 and a fifth time instant t5. Switch 222 is turned off from the fourth time instant t4 and a sixth time instant t6. The out of phase control results in cancellation of ripple currents in capacitors 201, 202, and 203, thereby reducing the power dissipation in these capacitors.

Although better efficiency can be achieved with the dual-phase step-up power conversion system shown in FIG. 3, there are eight power switches and five capacitors in the dual-phase step-up power conversion system. The eight power switches need a large silicon area and many external components.

As power consumption has become more important, there may be a need for simplifying the dual-phase step-up power conversion system shown in FIG. 3. More particularly, the dual-phase step-up power conversion system having eight power switches and five capacitors is not cost-effective. It is desirable to have a simplified system to perform the functions of the dual-phase step-up power conversion system described above with respect to FIG. 3-4.

SUMMARY

These and other problems are generally solved or circumvented, and technical advantages are generally achieved, by preferred embodiments of the present disclosure which provide a hybrid dual-phase step-up power conversion system.

In accordance with an embodiment, a hybrid dual-phase step-up power conversion system comprises a step-up converter apparatus comprising a first leg, a second leg, a first capacitor and a second capacitor, wherein the first capacitor and the second capacitor are cross-coupled between the first leg and the second leg, and a plurality of expansion circuits coupled to the step-up converter apparatus, wherein the plurality of expansion circuits is configured to increase a power conversion ratio of the hybrid dual-phase step-up power conversion system.

In accordance with another embodiment, a system comprises a first switch, a portion of a first type II expansion circuit, a second switch and a third switch coupled in series between an output terminal of the system and ground, a fourth switch, a portion of a second type II expansion circuit, a fifth switch and a sixth switch coupled in series between the output terminal of the system and ground, a first capacitor is connected between a common node of the fourth switch and the fifth switch, and a common node of the second switch and the first type II expansion circuit, a second capacitor is connected between a common node of the second switch and the third switch, and a common node of the fourth switch and the second type II expansion circuit, a first inductor connected between an input terminal of the system and the common node of the fifth switch and the sixth switch, and a second inductor connected between the input terminal of the system and the common node of the second switch and the third switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 10 illustrates a flow chart of a control method for the dual-phase step-up power conversion system shown in FIG. 5 in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid dual-phase step-up power conversion system. The invention may also be applied, however, to a variety of power systems. Hereinafter, various embodiments will be explained in detail with reference to the accompanying drawings.

Figure 1:
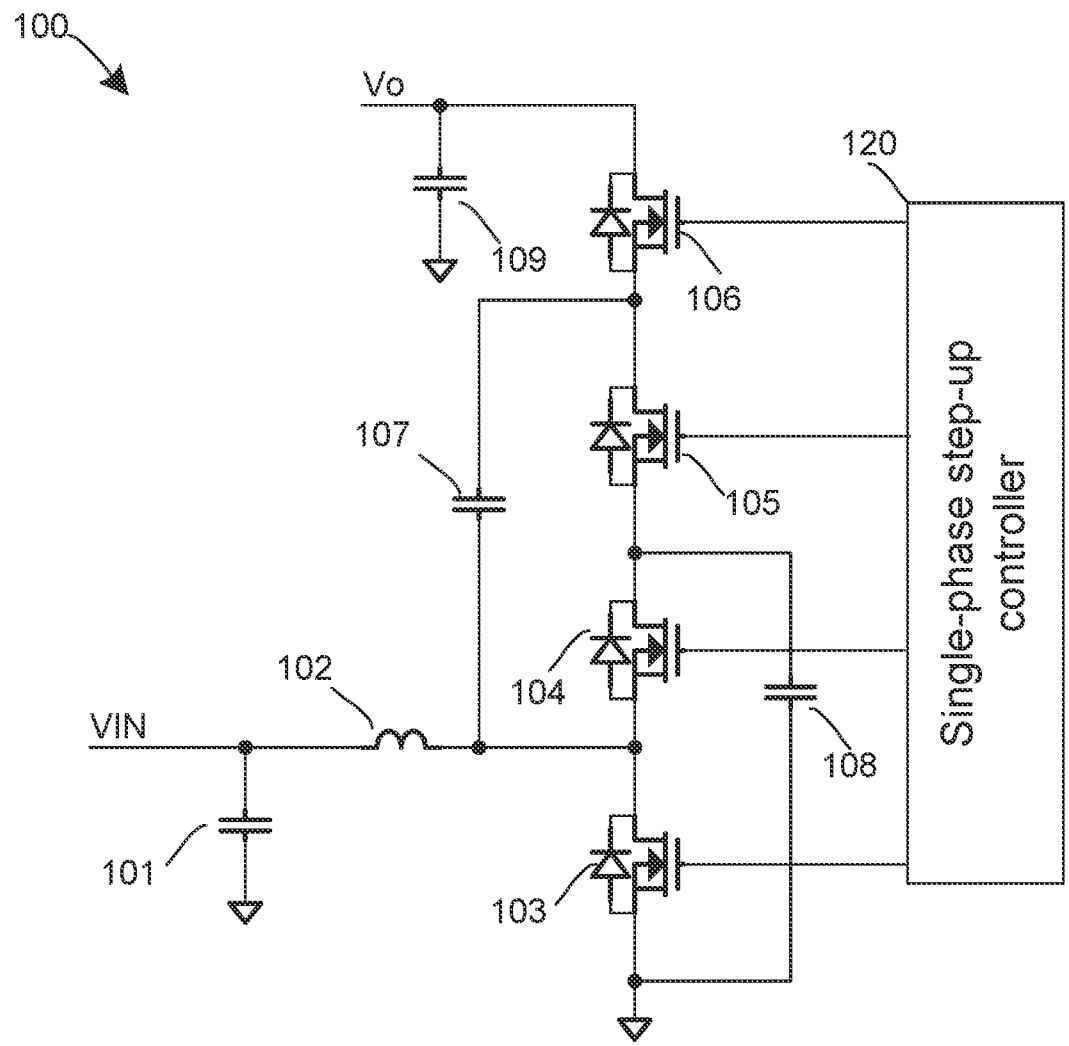
FIG. 1 illustrates a single-phase step-up power conversion system.
Figure 2:
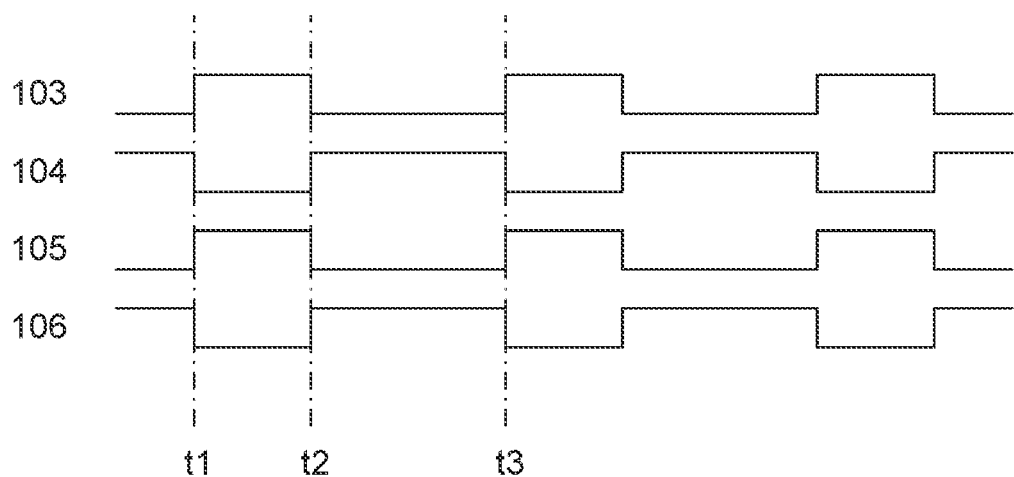
FIG. 2 illustrates gate drive signals associated with the single-phase step-up power conversion system shown in FIG. 1.
Figure 3:
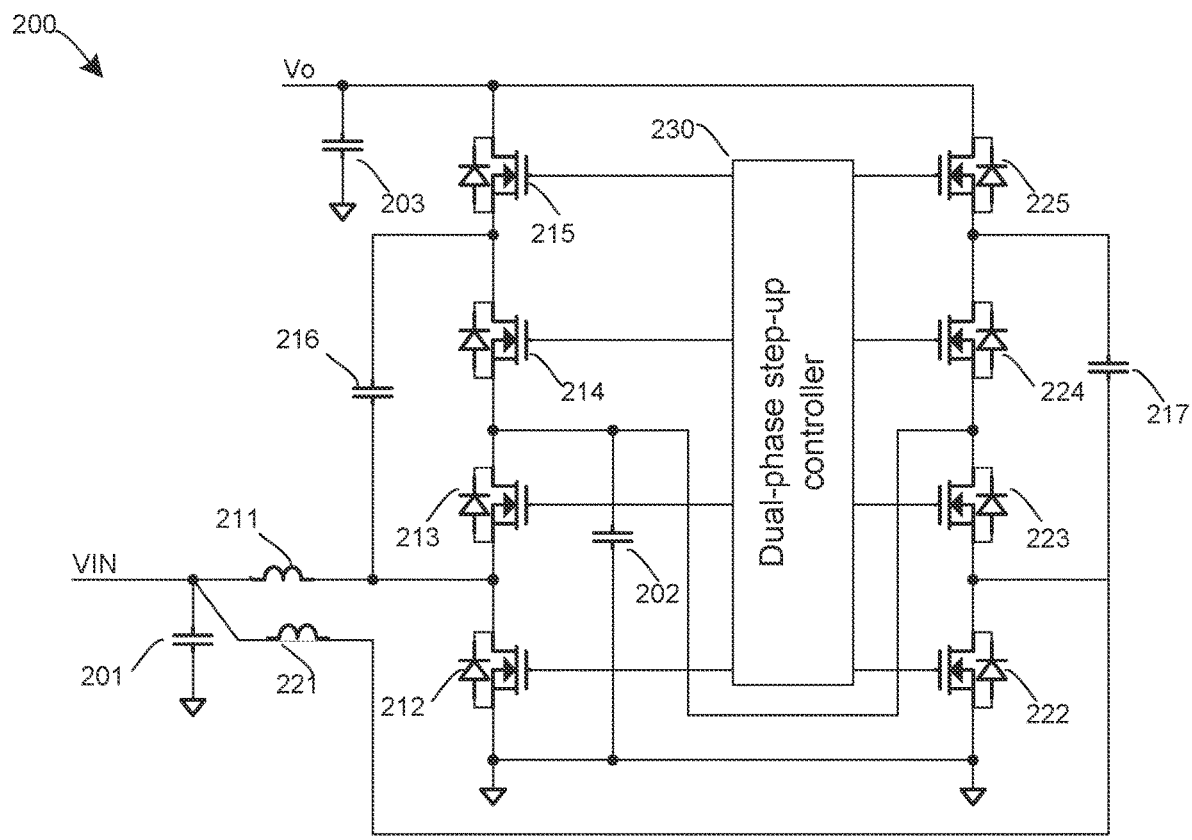
FIG. 3 illustrates a dual-phase step-up power conversion system.
Figure 4:
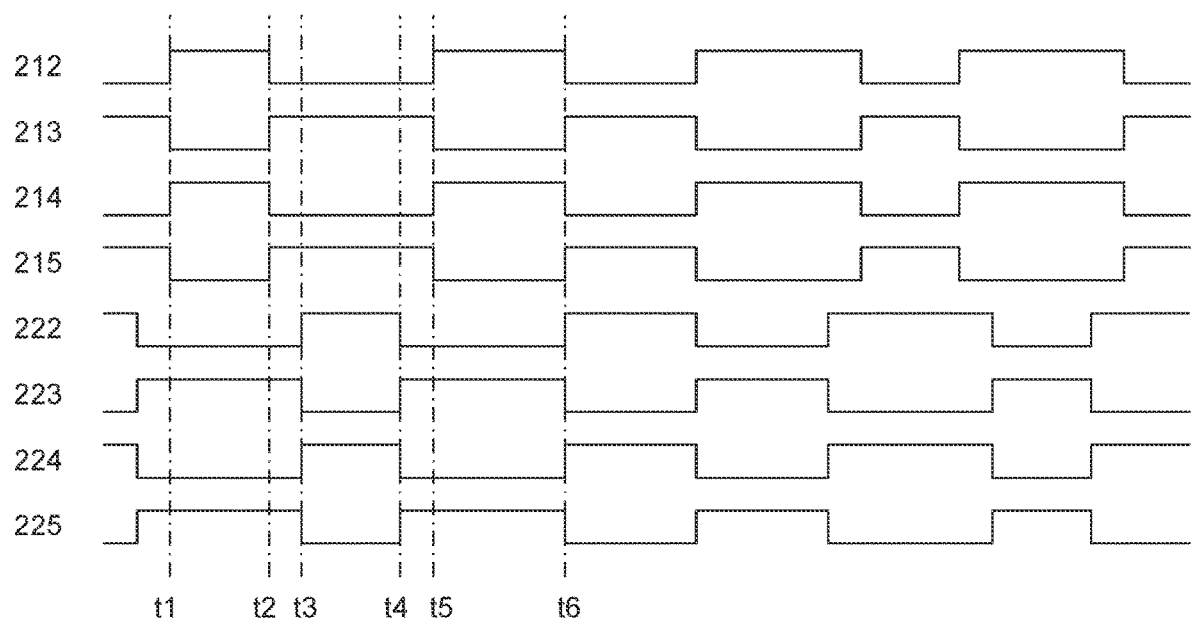
FIG. 4 illustrates gate drive signals associated with the dual-phase step-up power conversion system shown in FIG. 3.
Figure 5:
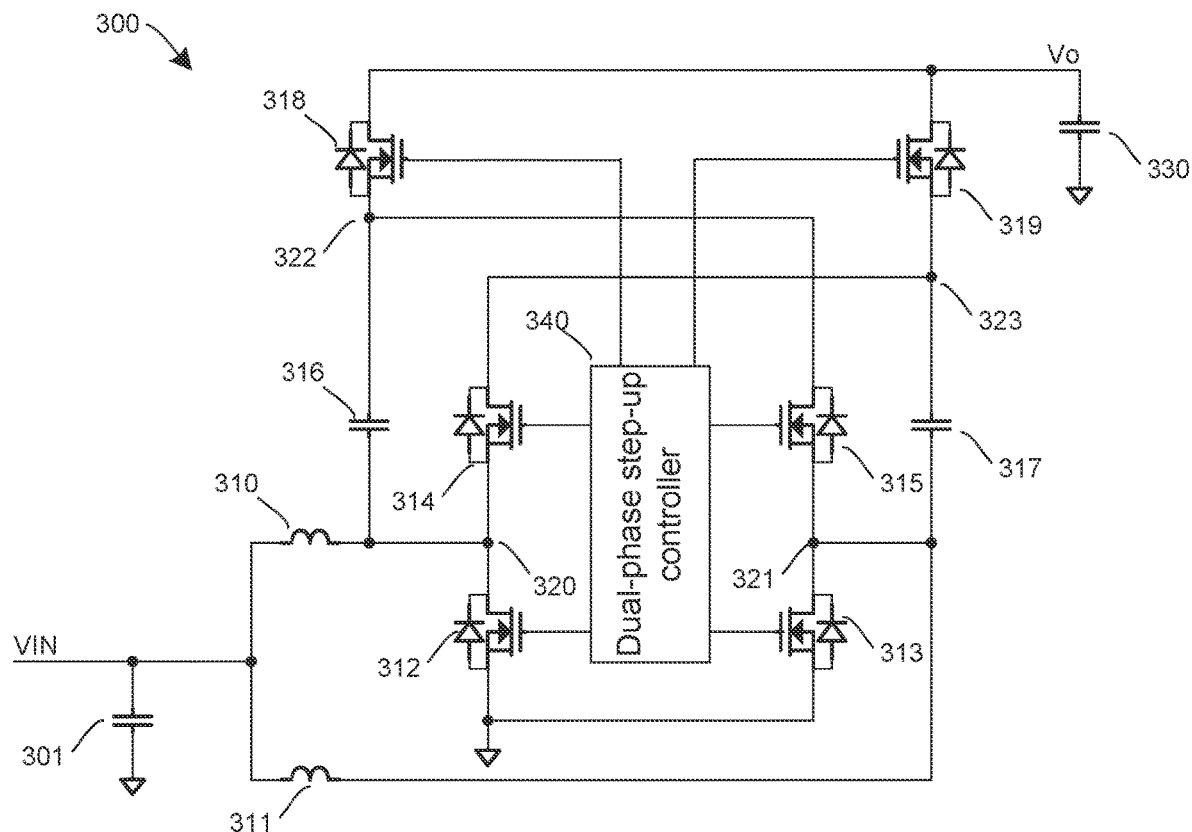
FIG. 5 illustrates a schematic diagram of a hybrid dual-phase step-up power conversion system in accordance with various embodiments of the present disclosure.

FIG. 5 illustrates a schematic diagram of a hybrid dual-phase step-up power conversion system in accordance with various embodiments of the present disclosure. The hybrid dual-phase step-up power conversion system 300 comprises an input capacitor 301, a first inductor 310, a second inductor 311, a first switch 319, a second switch 314, a third switch 312, a fourth switch 318, a fifth switch 315, a sixth switch 313, a first capacitor 316, a second capacitor 317 and an output capacitor 330. The hybrid dual-phase step-up power conversion system 300 further comprises a dual-phase step-up controller 340. The dual-phase step-up controller 340 is employed to generate suitable gate drive signals for controlling the switches 312, 313, 314, 315, 318 and 319.

The hybrid dual-phase step-up power conversion system 300 comprises two legs. A first leg comprises the first switch 319, the second switch 314 and the third switch 312 connected in series between an output terminal Vo and ground. A second leg comprises the fourth switch 318, the fifth switch 315 and the sixth switch 313 connected in series between the output terminal Vo and ground. As shown in FIG. 5, node 323 is a common node of the first switch 319 and the second switch 314. Node 320 is a common node of the second switch 314 and the third switch 312. Node 322 is a common node of the fourth switch 318 and the fifth switch 315. Node 321 is a common node of the fifth switch 315 and the sixth switch 313.

The first inductor 310 is connected between an input terminal VIN and node 320. The second inductor connected between VIN and node 321. The first capacitor 316 and the second capacitor 317 are cross-coupled between the first leg and the second leg. More particularly, the first capacitor 316 is connected between nodes 322 and 320. The second capacitor 317 is connected between nodes 323 and 321.

In some embodiments, the first inductor 310, the second switch 314, the third switch 312, the second inductor 311, the fifth switch 315, the sixth switch 313, the first capacitor 316 and the second capacitor 317 form a boost converter stage of the hybrid dual-phase step-up power conversion system 300. As shown in FIG. 5, the first inductor 310, the second switch 314, the third switch 312 and the second capacitor 317 form a first boost converter. The second inductor 311, the fifth switch 315, the sixth switch 313 and the first capacitor 316 form a second boost converter. On the other hand, the first switch 319, the second switch 314, the third switch 312, the fourth switch 318, the fifth switch 315, the sixth switch 313, the first capacitor 316 and the second capacitor 317 form a charge pump stage of the hybrid dual-phase step-up power conversion system 300. As shown in FIG. 5, the first switch 319, the second switch 314 and the third switch 312 form a first phase of the hybrid dual-phase step-up power conversion system 300. The fourth switch 318, the fifth switch 315 and the sixth switch 313 form a second phase of the hybrid dual-phase step-up power conversion system 300. The first capacitor 316 functions as a first flying capacitor. The second capacitor 317 functions as a second flying capacitor.

It should be noted many components shown in FIG. 5 are shared by the two stages of the hybrid dual-phase step-up power conversion system 300. These shared components help to reduce the total number of switches and capacitors in the hybrid dual-phase step-up power conversion system 300, thereby reducing the cost and improving the reliability of the hybrid dual-phase step-up power conversion system 300.

In operation, the second switch 314 and the third switch 312 are controlled by a first pair of complementary drive signals. The fifth switch 315 and the sixth switch 313 are controlled by a second pair of complementary drive signals. Drive signals of the third switch 312 and the sixth switch 313 are 180 degrees out of phase from each other. In some embodiments, the third switch 312 and the sixth switch 313 are configured to operate with a 50% duty cycle. Under the 50% duty cycle, an output voltage of the hybrid dual-phase step-up power conversion system 300 is four times greater than an input voltage of the hybrid dual-phase step-up power conversion system. In alternative embodiments, for adjusting the output voltage of the hybrid dual-phase step-up power conversion system, the third switch 312 and the sixth switch 313 may be configured to operate with a duty cycle in a range from 50% to 100%. The output voltage may be adjusted through varying the duty cycle.

In operation, switches of the first leg and switches of the second leg are configured such that a sum of a voltage across the first capacitor 316 and a voltage across the second capacitor 317 is fed into the output terminal of the hybrid dual-phase step-up power conversion system 300. More particularly, when the duty cycle is equal to 50%, the hybrid dual-phase step-up power conversion system 300 is configured to operate in two different operating modes. In a first operating mode, the third switch 312, the fifth switch 315, the first switch 319 are configured to be turned on, and the second switch 314, the sixth switch 313, the fourth switch 318 are configured to be turned off. In the first operating mode, the first capacitor 316 functions as an output capacitor of a boost converter stage of the hybrid dual-phase step-up power conversion system. The second capacitor 317 and the first capacitor 316 are connected in series between an output of the hybrid dual-phase step-up power conversion system and ground.

In a second operating mode, the third switch 312, the fifth switch 315, the first switch 319 are configured to be turned off, and the second switch 314, the sixth switch 313, the fourth switch 318 are configured to be turned on. In the second operating mode, the second capacitor 317 functions as an output capacitor of the boost converter stage of the hybrid dual-phase step-up power conversion system. The first capacitor 316 and the second capacitor 317 are connected in series between an output of the hybrid dual-phase step-up power conversion system and ground.

Furthermore, when the duty cycle is in a range from 50% to 100%, the hybrid dual-phase step-up power conversion system 300 is configured to operate in three different operating modes. The first two modes are similar to those described above, and hence are not discussed again to avoid repetition. In a third operating mode of the hybrid dual-phase step-up power conversion system, the third switch 312 and the sixth switch 313 are configured to be turned on, and the first switch 319, the second switch 314, the fourth switch 318 the fifth switch 315 are configured to be turned off. In the third operating mode, the first capacitor 316 and the second capacitor 317 are floating. The detailed description of these three operating modes will be described below with respect to FIGS. 6-9.

In accordance with an embodiment, the switches of FIG. 5 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 5 shows the switches (e.g., switch 312) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 5 may be implemented as a plurality of switches connected in parallel. Moreover, a capacitor may be connected in parallel with one switch to achieve zero voltage switching (ZVS)/zero current switching (ZCS).

Figure 6:
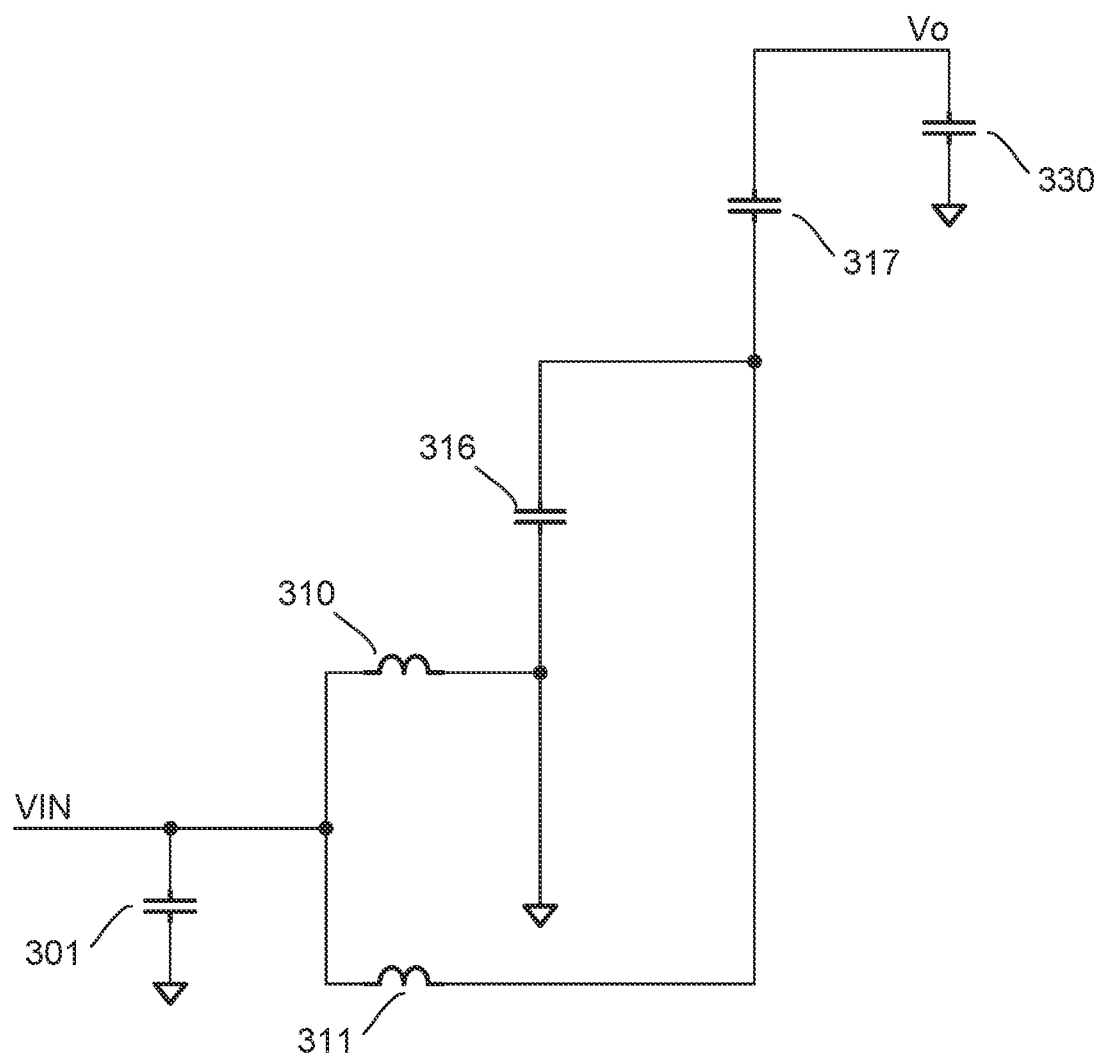
FIG. 6 illustrates an equivalent circuit of a first operating mode of the dual-phase step-up power conversion system shown in FIG. 5 in accordance with various embodiments of the present disclosure.
Figure 7:
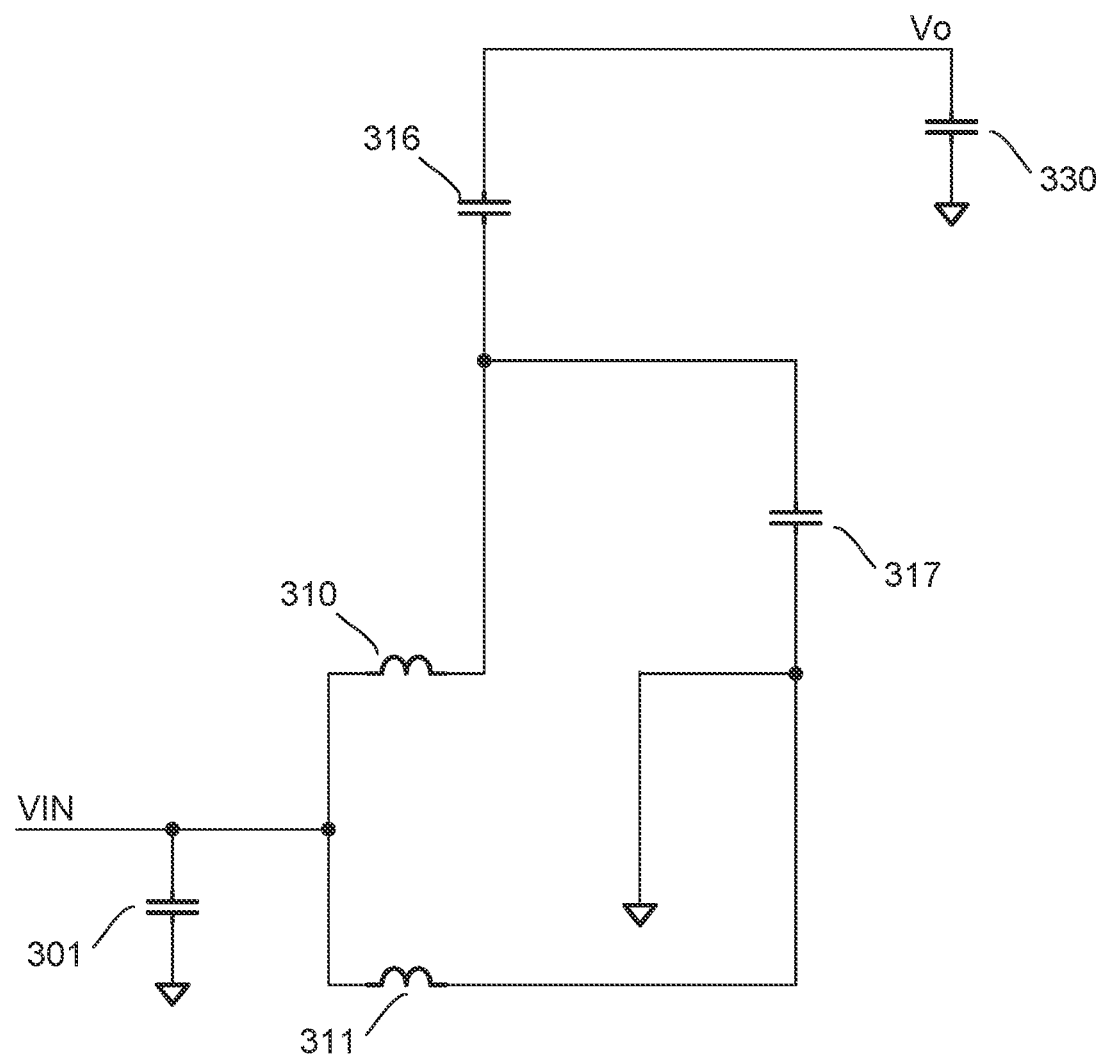
FIG. 7 illustrates an equivalent circuit of a second operating mode of the dual-phase step-up power conversion system shown in FIG. 5 in accordance with various embodiments of the present disclosure.
Figure 8:
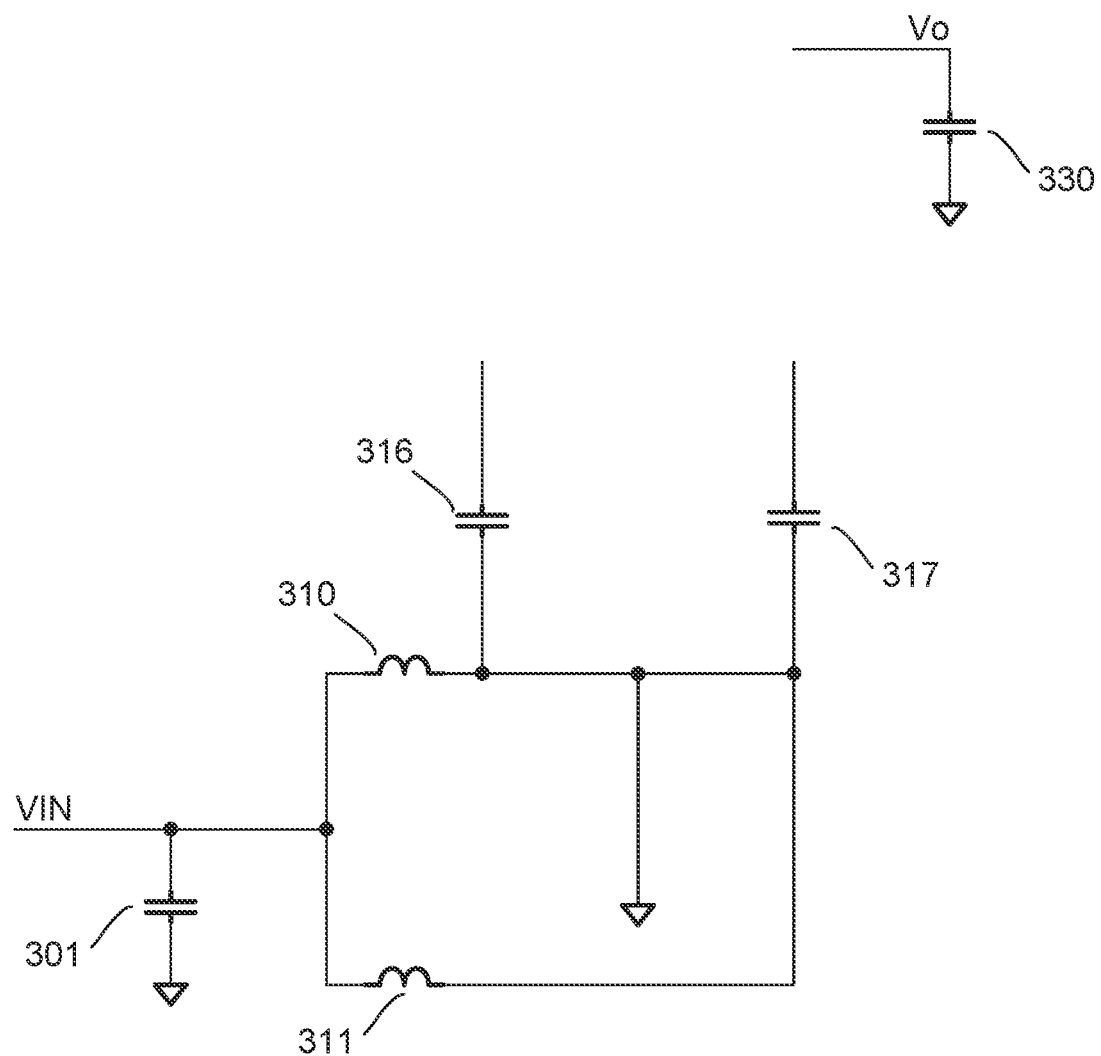
FIG. 8 illustrates an equivalent circuit of a third operating mode of the dual-phase step-up power conversion system shown in FIG. 5 in accordance with various embodiments of the present disclosure.

FIGS. 6-8 illustrate the three operating modes of the dual-phase step-up power conversion system shown in FIG. 5. To aid understanding and clarity, only the components relevant to this discussion are shown in FIGS. 6-8. Furthermore, the respective switches are shown as simple conductors (straight lines) when the switches are in the on state, and the respective switches are shown as open circuits when the switches are in the off state.

FIG. 6 illustrates an equivalent circuit of a first operating mode of the dual-phase step-up power conversion system shown in FIG. 5 in accordance with various embodiments of the present disclosure. In the first operating mode, the third switch 312, the fifth switch 315 and the first switch 319 are turned on, and the second switch 314, the sixth switch 313 and the fourth switch 318 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the fifth switch 315, the second inductor 311 is connected to the first capacitor 316. The current flowing through the second inductor 311 is fed into the first capacitor 316, and the energy stored in the second inductor 311 is deposited into the first capacitor 316.

Referring back to FIG. 5, in some embodiments, the third switch 312 and the sixth switch 313 operate with a duty cycle of 50%. Under this duty cycle, the average voltage across the first capacitor 316 is twice the voltage of the input voltage (VIN). The first capacitor 316 and the second capacitor 317 function as output capacitors of the second boost converter (formed by components 311, 313 and 315) and the first boost converter (formed by components 310, 312 and 314) respectively. These two boost converters are configured to operate in a symmetrical manner. Because of symmetry, the average voltage across the first capacitor 316 is equal to that of the second capacitor 317.

In response to the turn-on of the fifth switch 315 and the first switch 319, the second capacitor 317 is connected in series with the first capacitor 316 between the output terminal Vo and ground. The voltage across the series combination of the two capacitors is twice that of each individual capacitor or four times that of the input voltage (VIN).

FIG. 7 illustrates an equivalent circuit of a second operating mode of the dual-phase step-up power conversion system shown in FIG. 5 in accordance with various embodiments of the present disclosure. In the second operating mode, the third switch 312, the fifth switch 315 and the first switch 319 are turned off, and the second switch 314, the sixth switch 313 and the fourth switch 318 are turned on.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-on of the second switch 314, the first inductor 310 is connected to the second capacitor 317. The current flowing through the first inductor 310 is fed into the second capacitor 317, and the energy stored in the first inductor 310 is deposited into the second capacitor 317. In some embodiments, the third switch 312 and the sixth switch 313 operate with a duty cycle of 50%. Under this duty cycle, the average voltage across the second capacitor 317 is twice the voltage of the input VIN.

In response to the turn-on of the second switch 314 and the fourth switch 318, the first capacitor 316 is connected in series with the second capacitor 317 between the output terminal Vo and ground. The voltage across the series combination of the two capacitors is twice that of each individual capacitor or four times that of the input VIN.

FIG. 8 illustrates an equivalent circuit of a third operating mode of the dual-phase step-up power conversion system shown in FIG. 5 in accordance with various embodiments of the present disclosure. In the third operating mode, the third switch 312 and the sixth switch 313 are turned on, and the first switch 319, the second switch 314, the fourth switch 318 and the fifth switch 315 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-off of the first switch 319, the second switch 314, the fourth switch 318 and the fifth switch 315, the first capacitor 316 and the second capacitor 317 are floating as shown in FIG. 8.

Figure 9:
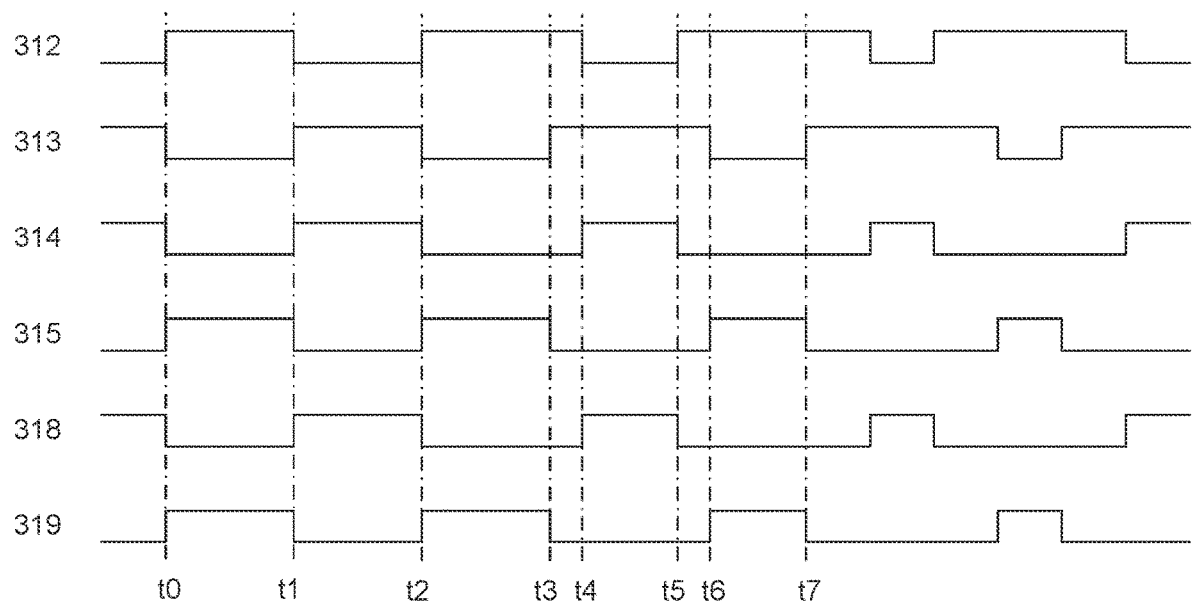
FIG. 9 illustrates gate drive signals associated with the dual-phase step-up power conversion system shown in FIG. 5 in accordance with various embodiments of the present disclosure.

FIG. 9 illustrates gate drive signals associated with the dual-phase step-up power conversion system shown in FIG. 5 in accordance with various embodiments of the present disclosure. Referring back to FIG. 5, the dual-phase step-up controller 340 is configured to generate the gate drive signals for switches 312, 313, 314, 315, 318 and 319. In some embodiments, the duty cycle of the switches 312 and 313 is in a range from 50% to 100%. As shown in FIG. 9, from t0 to t2, the switches 312 and 314 operate in a complementary manner. Switches 313 and 315 operate in a complementary manner. The gate drive signals of switches 312 and 314 are 180 degrees out of phase from each other. The switch 318 is in synchronization with the switch 314. The switch 319 is in synchronization with the switch 315.

From t0 to t2, the switches 312 and 313 operate with a duty cycle of 50%. The step-up ratio of the dual-phase step-up power conversion system is 1:4. The switches 312 and 313 can operate at a duty cycle greater than 50% to increase the step-up ratio up to a level greater than 1:4. In some embodiments, the dual-phase step-up controller 340 senses the output voltage Vo, and adjusts the duty cycle (from 50% to 100%) in a closed loop manner to achieve tight regulation of the dual-phase step-up power conversion system. The detailed operating principle of configuring the switches 312 and 313 to operate at a duty cycle greater than 50% will be discussed below.

From t2 to t3, the switch 312 is turned on and the switch 314 is turned off for a first time period corresponding to a duty cycle greater than 50%. The first time period is defined as DT. From t4 to t5, the switch 312 is turned off and the switch 314 is turned on for a second time period corresponding to one minus the duty cycle. The second time period is defined as T-DT. The phase difference between t2 and t3 is 180 degrees. From t3 to t6, the switch 313 is turned on and the switch 315 is turned off for a time period equal to DT. From t6 to t7, the switch 313 is turned off and the switch 315 is turned on for a time period equal to T-DT. The gate drive signal of the switch 318 is in synchronization with the gate drive signal of the switch 314. Likewise, the gate drive signal of the switch 319 is in synchronization with the gate drive signal of the switch 315.

Referring back to FIG. 6, the first operating mode shown in FIG. 6 corresponds to the switch configuration shown from t2 to t3 or from t0 to t1. Based on this switch configuration, the second capacitor 317 is connected in series with the first capacitor 316 between the output terminal Vo and ground.

Referring back to FIG. 7, the second operating mode shown in FIG. 7 corresponds to the switch configuration shown from t4 to t5 or from t1 to t2. Based on this switch configuration, the first capacitor 316 is connected in series with the second capacitor 317 between the output terminal Vo and ground.

Referring back to FIG. 8, the third operating mode shown in FIG. 8 corresponds to the switch configuration shown from t3 to t4. The time period from t3 to t4 is equal to DT-(T/2). Based on this switch configuration, the first capacitor 316 and the second capacitor 317 are floating. In particular, capacitors 316 and 317 are not connected in series, but are both switched to ground on one terminal and are unconnected on the other terminal. In addition, inductors 310 and 311 are both switched to ground on one terminal.

It should be noted that in the third operating mode (from t3 to t4), the charge pump stage is not active. Switches 318 and 319 are turned off to prevent discharging of the output capacitor 330.

It should further be noted that the switches 312 and 313 may operate with a duty cycle less than 50%. When the duty cycle is less than 50%, the dual-phase step-up controller 340 may create an operating mode in which switches 314 and 315 are simultaneously turned on. In response to the turn-on of switches 314 and 315, the capacitors 316 and 317 are connected in antiparallel. Such an antiparallel connection discharges the capacitors 316 and 317.

FIG. 10 illustrates a flow chart of a control method for the dual-phase step-up power conversion system shown in FIG. 5 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A hybrid dual-phase step-up power conversion system comprises a boost converter stage and a charge pump stage. The boost converter stage and the charge pump stage share a plurality of switches and capacitors. When the boost converter stage operates with a duty cycle equal to 50%, the dual-phase step-up power conversion system is configured to operate in two different operating modes. The step-up ratio of the dual-phase step-up power conversion system is 1:4. When the boost converter stage operates with a duty cycle greater than 50%, the dual-phase step-up power conversion system is configured to operate in three different operating modes. The step-up ratio is greater than 1:4.

At step 1002, a hybrid dual-phase step-up power conversion system is provided to convert an input voltage to an output voltage higher than the input voltage. The hybrid dual-phase step-up power conversion system comprises a first leg and a second leg. Both legs comprise a plurality of switches. The system further comprises a first capacitor and a second capacitor cross-coupled between the first leg and the second leg. In some embodiments, the hybrid dual-phase step-up power conversion system is implemented as the system shown in FIG. 5.

At step 1004, in a first operating mode of the hybrid dual-phase step-up power conversion system, the plurality of switches of the first leg and the second leg is configured such that the second capacitor and the first capacitor are connected in series between an output of the hybrid dual-phase step-up power conversion system and ground.

At step 1006, in a second operating mode of the hybrid dual-phase step-up power conversion system, the plurality of switches of the first leg and the second leg is configured such that the first capacitor and the second capacitor are connected in series between the output of the hybrid dual-phase step-up power conversion system and ground.

Figure 11:
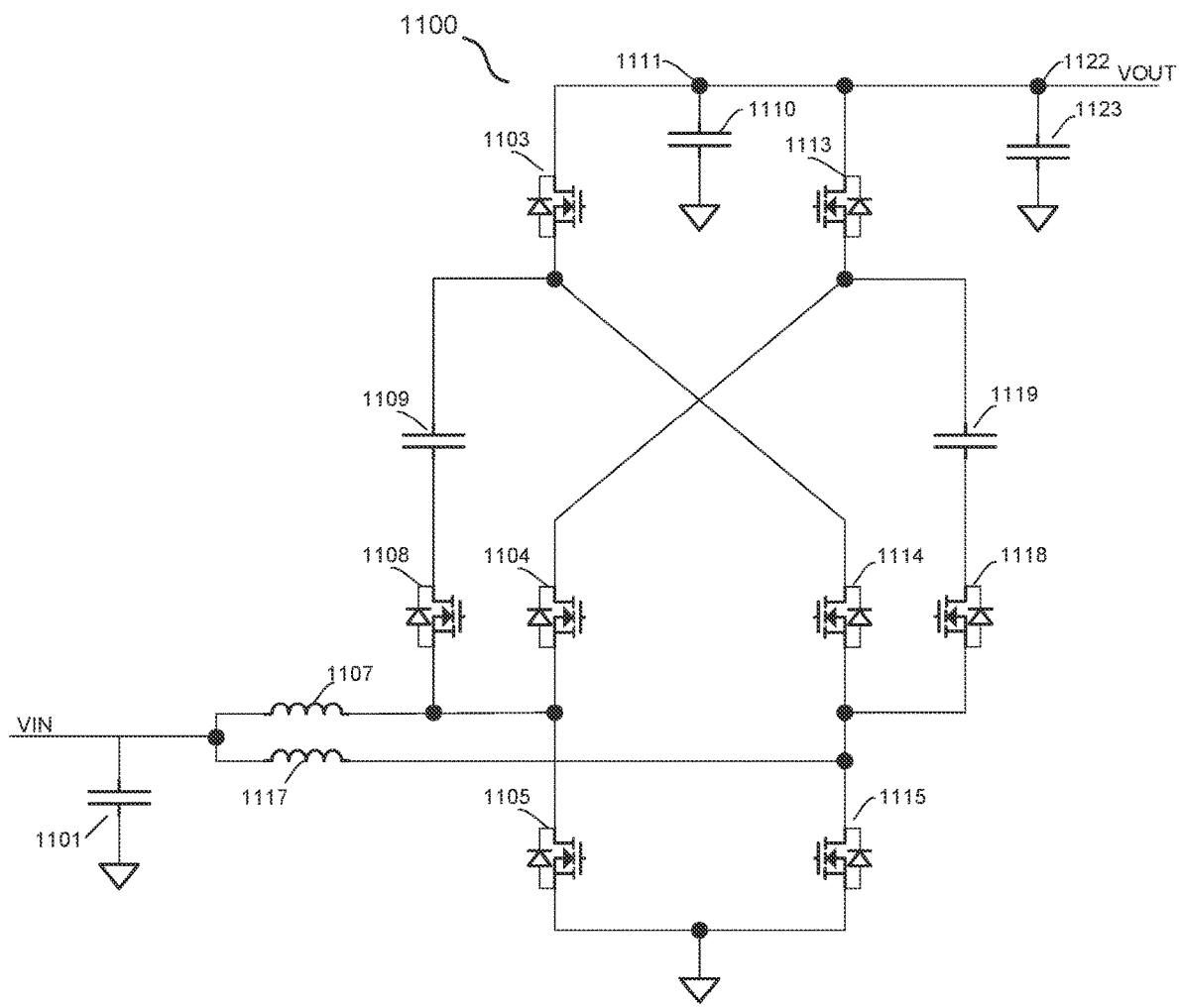
FIG. 11 illustrates a schematic diagram of another hybrid dual-phase step-up power conversion system in accordance with various embodiments of the present disclosure.

FIG. 11 illustrates a schematic diagram of another hybrid dual-phase step-up power conversion system in accordance with various embodiments of the present disclosure. The hybrid dual-phase step-up power conversion system 1100 comprises switches 1103, 1104, 1105, 1108, 1113, 1114, 1115 and 1118, capacitors 1101, 1109, 1119, 1110 and 1123, and inductors 1107 and 1117. The structure and operating principle of the hybrid dual-phase step-up power conversion system 1100 are similar to those of the hybrid dual-phase step-up power conversion system 300 shown in FIG. 5 except that switches 1108 and 1118 are employed to further improve the performance of the hybrid dual-phase step-up power conversion system. In particular, the hybrid dual-phase step-up power conversion system 1100 may be configured as a dual-phase boost conversion system through turning off the switches 1108 and 1118. The dual-phase boost configuration of the system (turning off switches 1108 and 1118) may be alternatively referred to as a bypass mode of the hybrid dual-phase step-up power conversion system 1100. The dual-phase boost conversion system is well known in the art, and hence is not discussed in detail to avoid repetition.

Figure 12:
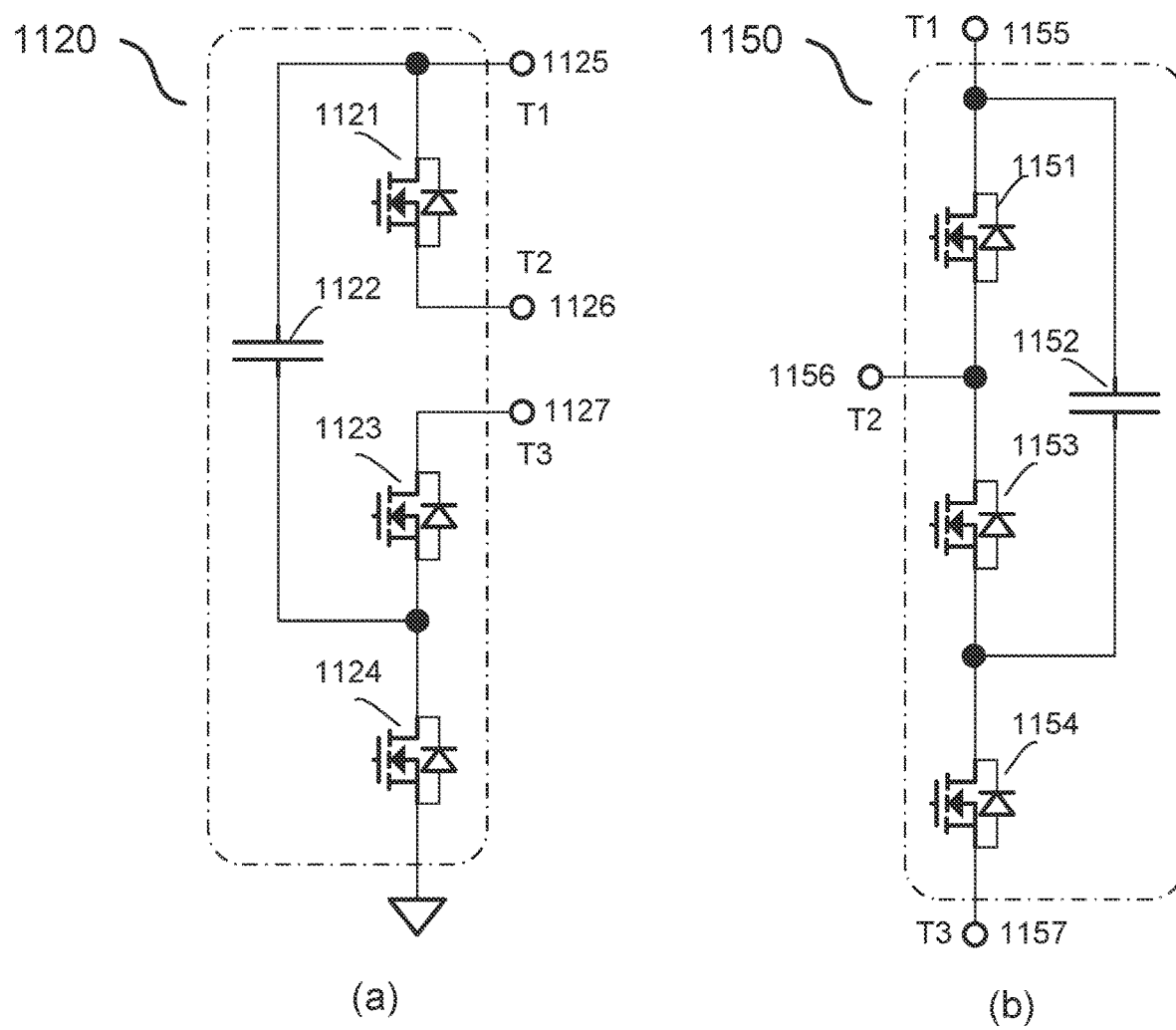
FIG. 12 illustrates schematic diagrams of two expansion circuits applied to the hybrid dual-phase step-up power conversion system shown in FIG. 5 in accordance with various embodiments of the present disclosure.

In some embodiments, expansion circuits can be added on top of the hybrid dual-phase step-up power conversion system 300 shown in FIG. 5 to achieve a higher step-up conversion ratio. FIG. 12 illustrates schematic diagrams of two expansion circuits applied to the hybrid dual-phase step-up power conversion system shown in FIG. 5 in accordance with various embodiments of the present disclosure.

A type I expansion circuit 1120 comprises an expansion capacitor 1122, a first expansion switch 1121, a second expansion switch 1123, and a third expansion switch 1124. The type I expansion unit 1120 has three external terminals, namely a first terminal 1125 (T1), a second terminal 1126 (T2) and a third terminal 1127 (T3). As shown in FIG. 12, the first expansion switch 1121 is connected between the first terminal 1125 and the second terminal 1126. The expansion capacitor 1122 is connected between the first terminal 1125 and a common node of the second expansion switch 1123 and the third expansion switch 1124. The second expansion switch 1123 is connected in series with the third expansion switch 1124 between the third external terminal 1127 and ground.

A type II expansion circuit 1150 comprises an expansion capacitor 1152, a fourth expansion switch 1151, a fifth expansion switch 1153 and a sixth expansion switch 1154. The type II expansion circuit 1150 has three external terminals, namely a first terminal 1155 (T1), a second terminal 1156 (T2) and a third terminal 1157 (T3). As shown in FIG. 12, the fourth expansion switch 1151, the fifth expansion switch 1153 and the sixth expansion switch 1154 are connected in series between the first terminal 1155 and the third terminal 1157. The expansion capacitor 1152 is connected between the first terminal 1155 and a common node of the fifth expansion switch 1153 and the sixth expansion switch 1154. The common node of the fourth expansion switch 1151 and the fifth expansion switch 1153 is connected to the second terminal 1156 of the type II expansion circuit 1150.

Figure 13:
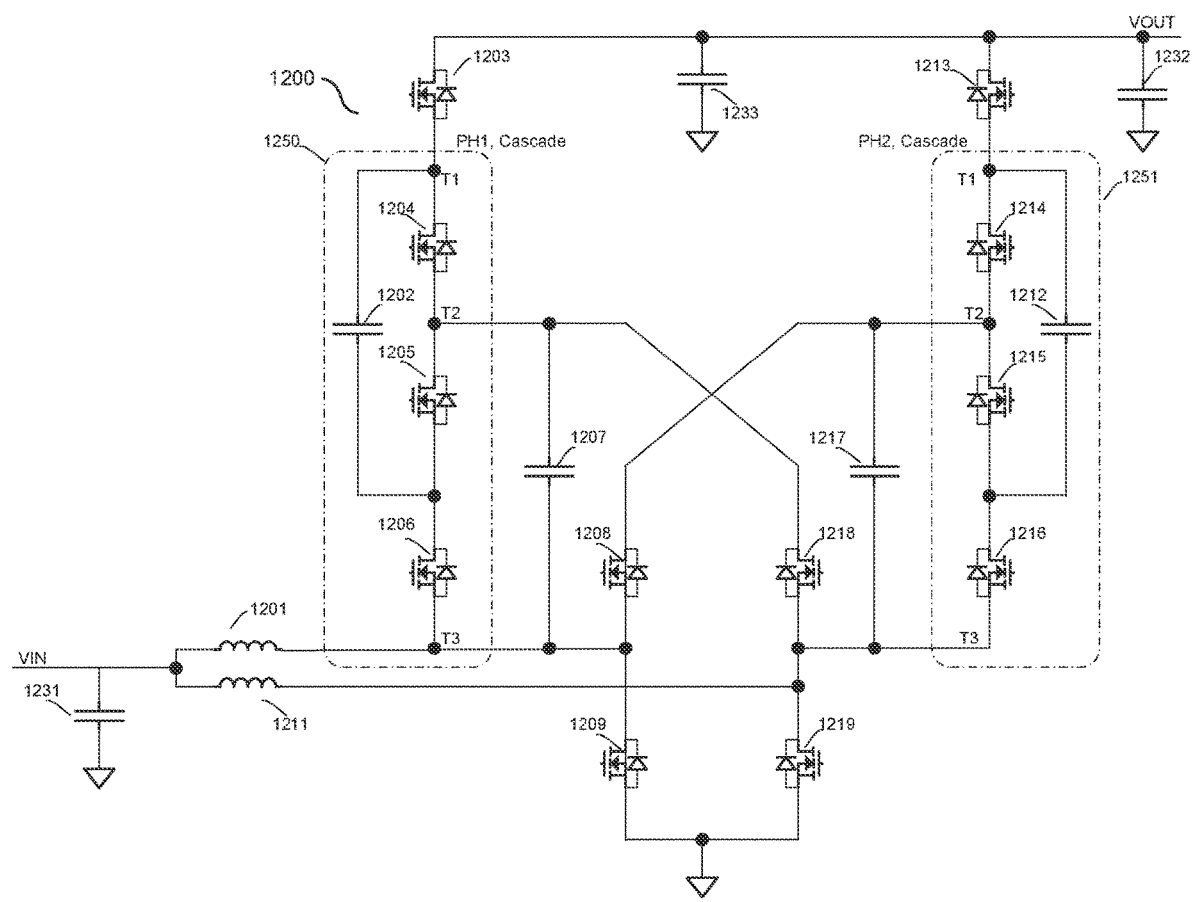
FIG. 13 illustrates a first implementation of a hybrid dual-phase step-up power conversion system including two type II expansion circuits in accordance with various embodiments of the present disclosure.

Either the type I expansion circuit 1120 or the type II expansion circuit 1150 can be added into the hybrid dual-phase step-up power conversion system 300 shown in FIG. 5 to achieve a higher step-up conversion ratio. FIG. 13 illustrates a first implementation of a hybrid dual-phase step-up power conversion system including two type II expansion circuits in accordance with various embodiments of the present disclosure.

The hybrid dual-phase step-up power conversion system 1200 comprises the hybrid dual-phase step-up converter 300 shown in FIG. 5. Referring back to FIG. 5, switches 1203, 1218, 1219 and capacitor 1207 are between VOUT and ground, and these components correspond to a first phase leg of the hybrid dual-phase step-up converter 300. Switches 1213, 1208, 1209 and capacitor 1217 are between VOUT and ground, and these components correspond to a second phase leg of the hybrid dual-phase step-up converter 300. The portion of the hybrid dual-phase step-up power conversion system 1200 including the components of the hybrid dual-phase step-up converter 300 may be alternatively referred to as a step-up converter apparatus throughout the description. The hybrid dual-phase step-up power conversion system 1200 further comprises a first type II expansion circuit 1250 and a second type II expansion circuit 1251 as shown in FIG. 13.

In comparison with the hybrid dual-phase step-up converter 300 shown in FIG. 5, the first type II expansion circuit 1250 is inserted between the first switch 1203 and the second switch 1218 of the first phase leg. The first terminal T1 and the second terminal T2 of the first type II expansion circuit 1250 are connected to switches 1203 and 1218, respectively. The third terminal T3 of the first type II expansion circuit 1250 is connected to a common node of the capacitor 1207 and the input inductor 1201.

The first type II expansion circuit 1250 comprises three expansion switches connected in series, namely a first expansion switch 1204, a second expansion switch 1205 and a third expansion switch 1206. The first type II expansion circuit 1250 further comprises an expansion capacitor 1202 connected between a common node of switches 1203 and 1204, and a common node of switches 1205 and 1206.

The hybrid dual-phase step-up power conversion system 1200 further comprises the second type II expansion circuit 1251 inserted between the first switch 1213 and the second switch 1208 of the second phase leg. The first terminal T1 and the second terminal T2 of the second type II expansion circuit 1251 are connected to switches 1213 and 1208, respectively. The third external terminal T3 of the second type II expansion circuit 1251 is connected to the common node of the capacitor 1217 and input inductor 1211.

The second type II expansion circuit 1251 comprises three expansion switches connected in series, namely a first expansion switch 1214, a second expansion switch 1215 and a third expansion switch 1216. The second type II expansion circuit 1251 further comprises an expansion capacitor 1212 connected between a common node of switches 1213 and 1214, and a common node of switches 1215 and 1216.

Similar to the operation of the hybrid dual-phase step-up converter 300 in FIG. 5, during the operation of the hybrid dual-phase step-up converter 1200, the switches 1208 and 1209 are controlled by a first pair of complementary drive signals. The switches 1218 and 1219 are controlled by a second pair of complementary drive signals. Drive signals of the switch 1209 and the switch 1219 are 180 degrees out of phase from each other. The switch 1203 and the expansion switch 1205 share the same drive signal with the switch 1208. The expansion switch 1204 and the expansion switch 1206 share the same drive signal with the switch 1209. Similarly, the switch 1213, the expansion switch 1215 share the same drive signal with the switch 1218. The expansion switch 1214 and the expansion switch 1216 share the same drive signal with the switch 1219.

In some embodiments, the switch 1209 and the switch 1219 are configured to operate with a 50% duty cycle. Under the 50% duty cycle, an output voltage (VOUT) of the hybrid dual-phase step-up power conversion system 1200 is six times greater than an input voltage (VIN) of the hybrid dual-phase step-up power conversion system 1200. In other words, the hybrid dual-phase step-up power conversion system 1200 is of a step-up conversion ratio of 6:1.

In alternative embodiments, for adjusting the output voltage of the hybrid dual-phase step-up power conversion system 1200, the switch 1209 and the switch 1219 may be configured to operate with a duty cycle in a range from 50% to 100%. The output voltage may be adjusted through varying the duty cycle. By adjusting the duty cycle, the hybrid dual-phase step-up power conversion system 1200 is of a step-up conversion ratio greater than 6:1.

Similar to the hybrid dual-phase step-up power conversion system 300 shown in FIG. 5, the hybrid dual-phase step-up power conversion system 1200 can be configured to operate in three different operating modes when the duty cycle of the switches 1209 and 1219 is in a range from 50% to 100%.

In a first operating mode, the switches 1203, 1208, 1219 and the expansion switches 1205, 1214, 1216 are turned on, and the rest of the switches and the expansion switches are turned off. In the first operating mode, the capacitor 1217 and the expansion capacitor 1212 are connected in parallel, and these two capacitors are simultaneously charged by a current built up in the input inductor 1201 during a previous cycle. These two capacitors are charged to a level equal to the voltage on the common node of the inductor 1201 and the capacitor 1207. At the same time, the input inductor 1201 is connected in series with the capacitor 1207 and the expansion capacitor 1202. Both the voltage across the capacitor 1202 and the voltage across the capacitor 1207 are charged to a voltage level similar to the voltage on the common node of the input inductor 1201 and the capacitor 1207 during the previous cycle. In the current cycle, a cascade connection of the inductor 1201, the capacitor 1207, and the capacitor 1202 further charges the output capacitors 1232 and 1233 to a level equal to triple the voltage on the common node of the input inductor 1201 and the capacitor 1207. As such, the output voltage VOUT is at least six times greater than the input voltage VIN. During the first operating mode, the input inductor 1211 is shorted to ground through the switch 1219 for building up magnetic energy in the input inductor 1211.

In a second operating mode, the switches 1213, 1218, 1209 and the expansion switches 1215, 1204, 1206 are turned on, and the rest of the switches and the expansion switches are turned off. In the second operating mode, the capacitor 1207 and the expansion capacitor 1202 are connected in parallel. The capacitor 1207 and the expansion capacitor 1202 are simultaneously charged by a current built up in the input inductor 1211 during a previous cycle. The capacitor 1207 and the expansion capacitor 1202 are charged to a level equal to the voltage on the common node of inductor 1211 and capacitor 1217. At the same time, the input inductor 1211 is connected in series with the capacitor 1217 and the expansion capacitor 1212. Both the voltage across the capacitor 1217 and the voltage across the capacitor 1212 are charged to a voltage level similar to the voltage on the common node of input inductor 1211 and capacitor 1217 during the previous cycle. A cascading connection of the inductor 1211, the capacitor 1217, and the capacitor 1212 further charges the output capacitor 1232 and 1233 to a level equal to triple the voltage of the voltage on the common node of input inductor 1211 and capacitor 1217. As such, the output voltage VOUT is at least six times greater than the input voltage VIN. During the second operating mode, the input inductor 1201 is shorted to ground through the switch 1209 for building up magnetic energy in the input inductor 1201.

In a third operating mode, the switches 1209, 1219 and the expansion switches 1204, 1206, 1214, 1216 are turned on, and the rest of the switches and the expansion switches are turned off. In the third operating mode, both of the input inductors 1201 and 1211 are shorted to ground through switch 1209 and 1219 to build up magnetic energy in the input inductors 1201 and 1211. The third operating mode is used between every transition from the first operating mode to the second operating mode when the duty cycle is greater than 50%, to build up more energy in input inductors in order to achieve a conversion ratio higher than 6:1.

Figure 14:
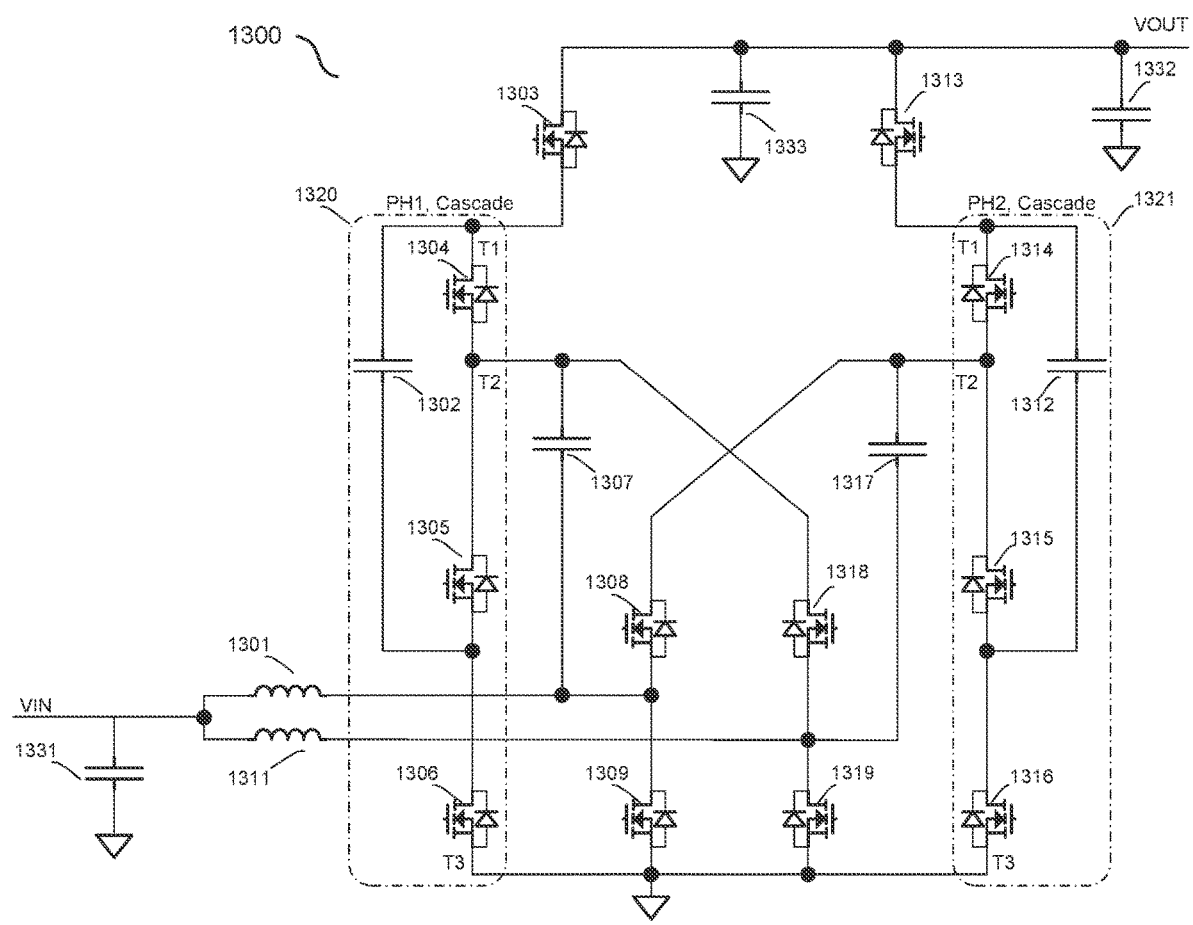
FIG. 14 illustrates a second implementation of a hybrid dual-phase step-up power conversion system including two type II expansion circuits in accordance with various embodiments of the present disclosure.

FIG. 14 illustrates a second implementation of a hybrid dual-phase step-up power conversion system including two type II expansion circuits in accordance with various embodiments of the present disclosure. The hybrid dual-phase step-up power conversion system 1300 comprises the hybrid dual-phase step-up converter 300 shown in FIG. 5. Referring back to FIG. 5, switches 1303, 1318, 1319 and capacitor 1307 are between VOUT and ground. These components correspond to a first phase leg of the hybrid dual-phase step-up converter 300. Switches 1313, 1308 1309 and capacitor 1317 are between VOUT and ground. These components correspond to a second phase leg of the hybrid dual-phase step-up converter 300. The hybrid dual-phase step-up power conversion system 1300 further comprises a first type II expansion circuit 1320 and a second type II expansion circuit 1321.

In comparison with the hybrid dual-phase step-up converter 300 shown in FIG. 5, the first type II expansion circuit 1320 is inserted between the first switch 1303 and the second switch 1318 of the first phase leg. The first terminal T1 of the first type II expansion circuit 1320 is connected to switches 1303. The second terminal T2 of the first type II expansion circuit 1320 is connected to the switch 1318. The third terminal T3 of the first type II expansion circuit 1320 is connected to ground.

The first type II expansion circuit 1320 comprises three expansion switches connected in series, namely a first expansion switch 1304, a second expansion switch 1305 and a third expansion switch 1306. The first type II expansion circuit 1320 further comprises an expansion capacitor 1302 connected between a common node of switches 1303 and 1304, and a common node of switches 1305 and 1306.

The hybrid dual-phase step-up power conversion system 1300 further comprises the second type II expansion circuit 1321 inserted between the first switch 1313 and the second switch 1308 of the second phase leg. The first terminal T1 of the second type II expansion circuit 1321 is connected to the switch 1313. The second terminal T2 of the second type II expansion circuit 1321 is connected to the switch 1308. The third terminal T3 of the second type II expansion circuit 1321 is connected to ground.

The second type II expansion circuit 1321 comprises three expansion switches connected in series, namely a first expansion switch 1314, a second expansion switch 1315 and a third expansion switch 1316. The second type II expansion circuit 1321 further comprises an expansion capacitor 1312 connected between a common node of switches 1313 and 1314, and a common node of switches 1315 and 1316.

Similar to the operation of the hybrid dual-phase step-up converter 300 in FIG. 5, during the operation of the hybrid dual-phase step-up converter 1300, the switches 1308 and 1309 are controlled by a first pair of complementary drive signals. The switches 1318 and 1319 are controlled by a second pair of complementary drive signals. Drive signals of the switch 1309 and the switch 1319 are 180 degrees out of phase from each other. The switch 1313 and the expansion switch 1315 share the same drive signal with the switch 1319. The expansion switch 1314 and the expansion switch 1316 share the same drive signal with the switch 1318. Similarly, the expansion switch 1304 and the expansion switch 1306 share the same drive signal with the switch 1308. The switch 1303 and the expansion switch 1305 share the same drive signal as the switch 1309.

In some embodiments, the switch 1309 and the switch 1319 are configured to operate with a 50% duty cycle. Under the 50% duty cycle, an output voltage (VOUT) of the hybrid dual-phase step-up power conversion system 1300 is six times greater than an input voltage (VIN) of the hybrid dual-phase step-up power conversion system 1300. In other words, the hybrid dual-phase step-up power conversion system 1300 is of a step-up conversion ratio of 6:1.

In alternative embodiments, for adjusting the output voltage of the hybrid dual-phase step-up power conversion system 1300, the switch 1309 and the switch 1319 may be configured to operate with a duty cycle in a range from 50% to 100%. The output voltage may be adjusted through varying the duty cycle. By adjusting the duty cycle, the hybrid dual-phase step-up power conversion system 1300 is of a step-up conversion ratio greater than 6:1.

Similar to the hybrid dual-phase step-up power conversion system 300 shown in FIG. 5, the hybrid dual-phase step-up power conversion system 1300 can be configured to operate in three different operating modes when the duty cycle of the switches 1309 and 1319 is in a range from 50% to 100%.

In a first operating mode, the switches 1303, 1318, 1309, and the expansion switches 1305, 1314, 1316 are turned on, and the rest of the switches and the expansion switches are turned off. In the first operating mode, the capacitor 1307 is charged by a current built up in the input inductor 1311 during a previous cycle. The capacitor 1307 is charged to a level equal to the voltage on the common node of the inductor 1311 and the capacitor 1317. The voltage across the capacitor 1317 is approximately equal to the voltage on the common node of the inductor 1311 and the capacitor 1317 from a previous cycle. The capacitor 1317 is connected in series with the input inductor 1311 to charge the expansion capacitor 1312 to a voltage level equal to twice the voltage on the common node of inductor 1311 and capacitor 1317. At the same time, the expansion capacitor 1302 is also connected in series with the input inductor 1311. The voltage across the expansion capacitor 1302 is approximately equal to twice the voltage on the common node of the inductor 1311 and the capacitor 1317 from a previous cycle. The input inductor 1311 and the expansion capacitor 1302 are connected in series to charge the output capacitor 1332 and 1333 to a voltage level equal to triple the voltage of the voltage on the common node of the input inductor 1311 and the capacitor 1317, which is at least six times the input voltage VIN. During the first operating mode, the input inductor 1301 is shorted to ground through the switch 1309 to build up magnetic energy in the inductor 1301.

In a second operating mode, the switches 1313, 1308, 1319, and expansion switches 1315, 1304, 1306 are turned on, and the rest of the switches and expansion switches are turned off. In the second operating mode, the capacitor 1317 is charged by a current built up in the input inductor 1301 during a previous cycle. The capacitor 1317 is charged up to a voltage level equal to the voltage on the common node of the inductor 1301 and the capacitor 1307. The voltage across the capacitor 1307 is approximately equal to the voltage on the common node of the inductor 1301 and the capacitor 1307 from a previous cycle. The capacitor 1307 and the input inductor 1301 are connected in series to charge the expansion capacitor 1302. The expansion capacitor 1302 is charged up to a voltage level equal to twice the voltage on the common node of the inductor 1301 and the capacitor 1307. At the same time, the expansion capacitor 1312 is also connected in series with the input inductor 1301. The voltage across the expansion capacitor 1312 is approximately equal to twice the voltage on the common node of the inductor 1301 and the capacitor 1307 from a previous cycle. The input inductor 1301 and the expansion capacitor 1312 are connected in series to charge the output capacitor 1332 and 1333 to a voltage level equal to triple the voltage on the common node of the input inductor 1301 and the capacitor 1307, which is at least six times the input voltage VIN. During the second operating mode, the input inductor 1311 is shorted to ground through the switch 1319 to build up magnetic energy in the input inductor 1311.

In a third operating mode, the switches 1309, 1319, 1303, 1313 and the expansion switches 1305, 1315 are turned on, and the rest of the switches and expansion switches are turned off. In the third operating mode, both input inductors 1301 and 1311 are shorted to ground through switches 1309 and 1319 respectively to build up magnetic energy. At the same time, the expansion capacitor 1302 and the capacitor 1307 are connected in series between VOUT and ground. The expansion capacitor 1312 and the capacitor 1317 are connected in series between VOUT and ground too. These two capacitor groups work together to provide current to the output capacitors 1332 and 1333 to maintain the voltage at VOUT when both input inductors 1301 and 1311 are shorted to ground. This unique capacitor configuration in the third operating mode allows the hybrid dual-phase step-up power conversion system 1300 to offer better output voltage ripple performance in comparison with the hybrid dual-phase step-up power conversion systems 300 and 1200. The third operating mode is used in every transition from the first operating mode to the second operating mode when the duty cycle is greater than 50%. The third operating mode is used to build up more energy in the input inductors in order to achieve a conversion ratio higher than 6:1.

The hybrid dual-phase step-up power conversion systems 1200 and 1300 can be further expanded to achieve even higher voltage step-up ratios by further cascading a plurality of type I expansion circuits, a plurality of type II expansion circuits or a combination of the type I expansion circuits and the type II expansion circuits.

Figure 15:
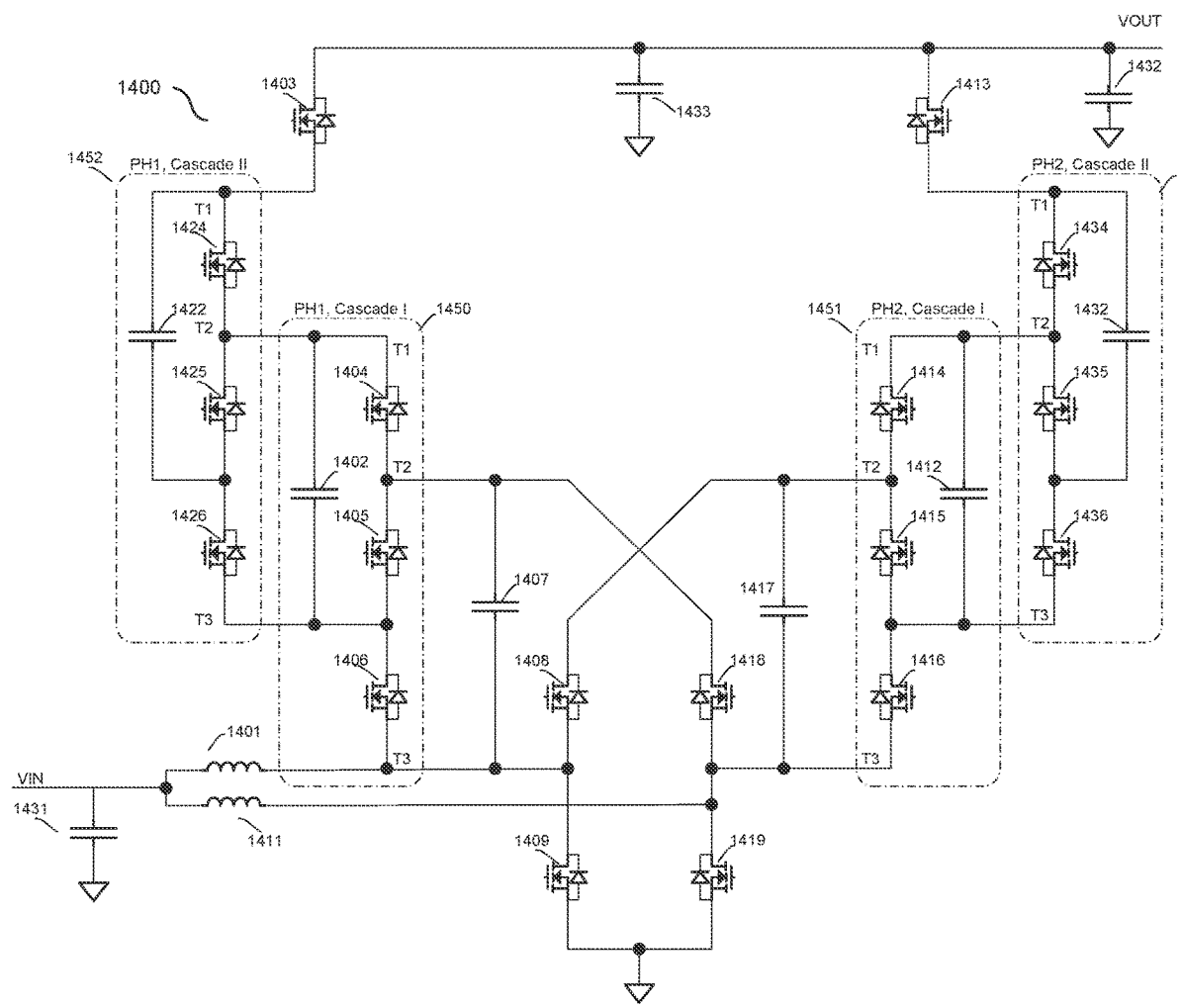
FIG. 15 illustrates a hybrid dual-phase step-up power conversion system including four type II expansion circuits in accordance with various embodiments of the present disclosure.

FIG. 15 illustrates a hybrid dual-phase step-up power conversion system including four type II expansion circuits in accordance with various embodiments of the present disclosure. The hybrid dual-phase step-up power conversion system 1400 is similar to the hybrid dual-phase step-up power conversion system 1200 shown in FIG. 13 except that two additional type II expansion circuits are employed to further increase the conversion ratio. In some embodiments, the hybrid dual-phase step-up power conversion system 1400 is capable of having at least an 8:1 step-up conversion ratio. The operating principle of the hybrid dual-phase step-up power conversion system 1400 is similar to that of the hybrid dual-phase step-up power conversion system 1200.

In operation, the expansion switches 1406, 1426, 1404, 1424 share the same drive signal with the switch 1409. The expansion switches 1405, 1425 and the switch 1403 share the same drive signal with the switch 1408. The expansion switches 1436, 1416, 1434, 1414 share the same drive signal with the switch 1419. The expansion switches 1415, 1435 and the switch 1413 share the same drive signal with the switch 1418. In this configuration, in each mode, one phase leg has all capacitors connected in shunt to be charged by the input inductors, while the other phase leg has all capacitors connected in series to charge the output capacitors to produce an output voltage equal to at least (N+4)×VIN. In some embodiments, N is the number of the type II expansion circuits. For example, in the hybrid dual-phase step-up power conversion system 1400, N is equal to 4. The step-up conversion ratio is at least 8:1. In other words, VOUT is equal to at least 8×VIN.

Figure 16:
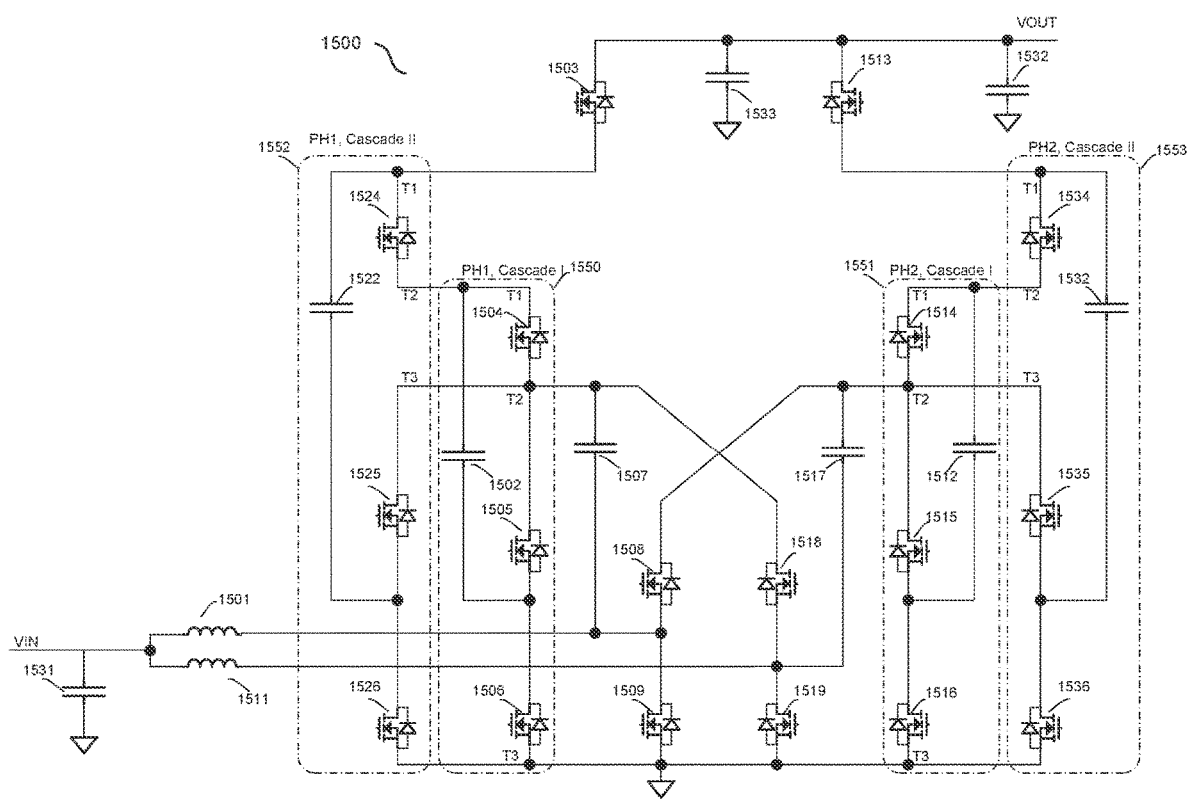
FIG. 16 illustrates a first implementation of a hybrid dual-phase step-up power conversion system including two type I expansion circuits and two type II expansion circuits in accordance with various embodiments of the present disclosure.

FIG. 16 illustrates a first implementation of a hybrid dual-phase step-up power conversion system including two type I expansion circuits and two type II expansion circuits in accordance with various embodiments of the present disclosure. The hybrid dual-phase step-up power conversion system 1500 is similar to the hybrid dual-phase step-up power conversion system 1300 shown in FIG. 14 except that two additional type I expansion circuits are employed to achieve at least a 10:1 conversion ratio.

The operating principle of the hybrid dual-phase step-up power conversion system 1500 is similar to that of the hybrid dual-phase step-up power conversion system 1300. In operation, the expansion switches 1524, 1505, 1526 shares the same drive signal with the switch 1509. The expansion switches 1506, 1525 and switch 1504 share the same drive signal with the switch 1508. The expansion switches 1514, 1516, 1535 and switch 1513 share the same drive signal with the switch 1518. The expansion switches 1515, 1534 and switch 1536 share the same drive signal with the switch 1519. In this configuration, the voltages across the capacitors accumulate as more type I expansion circuits are added in the fashion of Fibonacci sequence (that is 1, 1, 2, 3, 5, 8, 13 . . . ). The output voltage is equal to at least $$2 \cdot F\left(\frac{N}{2} + 3\right) \times VIN.$$

In some embodiments, N is the number of the expansion circuits, and F(n) is the Fibonacci sequence, where F(0)=0, F(1)=1, and F(n)=F(n−1)+F(n−2). In the hybrid dual-phase step-up power conversion system 1500, N is equal 4.

$$F\left(\frac{N}{2} + 3\right)$$

is equal to 5. As such, the step-up conversion ratio is at least 10:1. In other words, VOUT is equal to at least 10×VIN.

Figure 17:
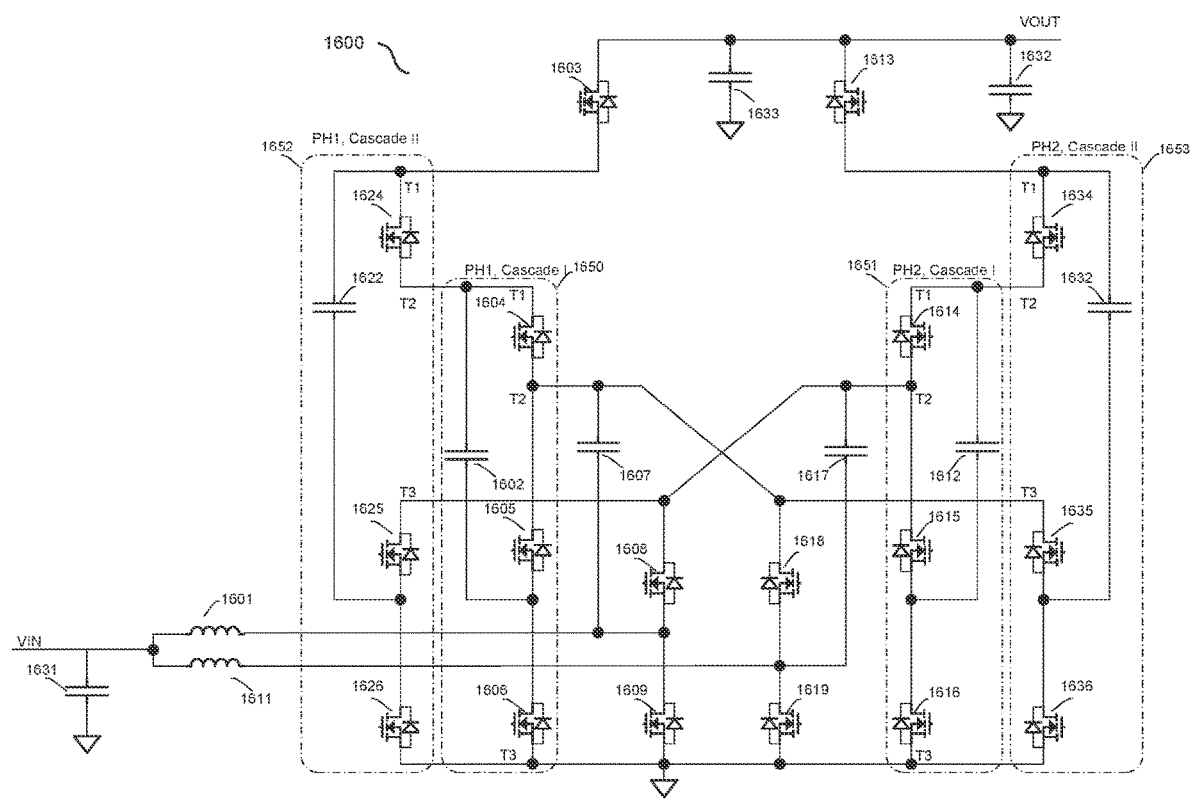
FIG. 17 illustrates a second implementation of a hybrid dual-phase step-up power conversion system including two type I expansion circuits and two type II expansion circuits in accordance with various embodiments of the present disclosure.

FIG. 17 illustrates a second implementation of a hybrid dual-phase step-up power conversion system including two type I expansion circuits and two type II expansion circuits in accordance with various embodiments of the present disclosure. The hybrid dual-phase step-up power conversion system 1600 comprises two additional type I expansion circuits 1652 and 1653 employed to achieve at least an 8:1 step-up conversion ratio. The hybrid dual-phase step-up power conversion system 1600 is similar to the hybrid dual-phase step-up power conversion system 1500 shown in FIG. 16 except that the third terminals T3 of the type I expansion circuits 1652 and 1653 are tied to the common node of the switch 1608 and the flying capacitor 1617, and the common node of the switch 1618 and the flying capacitor 1607, respectively.

The operating principle of the hybrid dual-phase step-up power conversion system 1600 is similar to that of the hybrid dual-phase step-up power conversion system 1300 shown in FIG. 14. In operation, the expansion switches 1624, 1605, 1626 share the same drive signal with the switch 1609. The expansion switches 1606, 1625, 1604, and the switch 1603 share the same drive signal with the switch 1608. The expansion switches 1614, 1616, 1635, and the switch 1613 share the same drive signal with the switch 1618. The expansion switches 1615, 1634, and the switch 1636 share the same drive signal with the switch 1619.

In this configuration, the voltages across the capacitors accumulate as more type I expansion circuits are added. In steady state operation, the voltage ratio between the voltages across the flying capacitors 1607, 1617 and VOUT is 1:4. The voltage ratio between the voltages across the flying capacitors 1602, 1612 and VOUT is 2:4. The voltage ratio between the voltages across the flying capacitors 1622, 1632 and VOUT is 3:4. In one phase leg, a capacitor (e.g., 1622 or 1632) having a voltage equal to (¾)×VOUT is connected in parallel with the other two capacitors connected in series. One of these two capacitors is of a voltage equal to (¼)× VOUT. The other of these two capacitors is of a voltage equal to (½)×VOUT. In the other phase leg, the flying capacitor with a (¾)×VOUT voltage is connected in series with the input inductor to provide a VOUT voltage to the output capacitors. The input inductor is also in series with the flying cap with a (¼)×VOUT voltage to charge the flying capacitor with a (½)×VOUT voltage. The output voltage is equal to at least (N+4)×VIN. In some embodiments, N is the number of the expansion circuits in the hybrid dual-phase step-up power conversion system 1600. As shown in FIG. 17, N is equal to 4. The step-up conversion ratio is at least 8:1.

Figure 18:
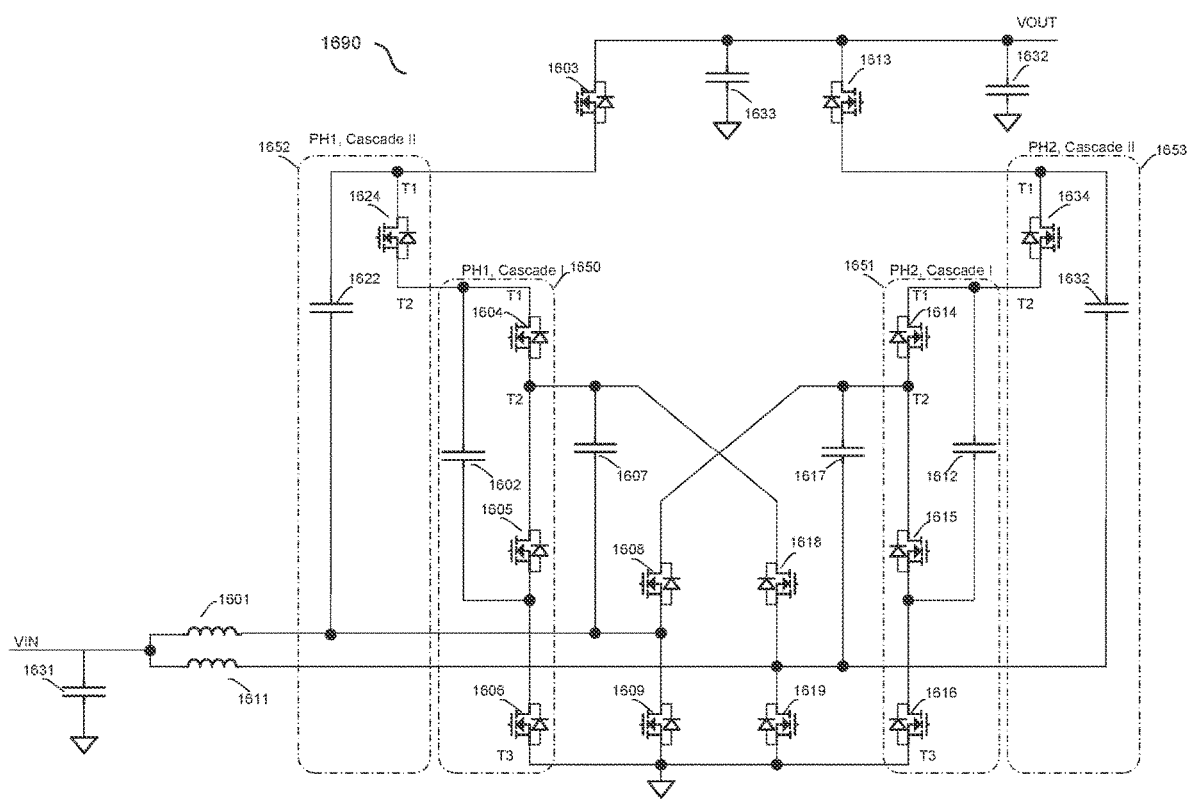
FIG. 18 illustrates a third implementation of a hybrid dual-phase step-up power conversion system including two type I expansion circuits and two type II expansion circuits in accordance with various embodiments of the present disclosure.

FIG. 18 illustrates a third implementation of a hybrid dual-phase step-up power conversion system including two type I expansion circuits and two type II expansion circuits in accordance with various embodiments of the present disclosure. Referring back to FIG. 17, the hybrid dual-phase step-up power converters 1600 can also be simplified to achieve the same function.

As shown in FIG. 17, a first phase leg comprises the switch 1625 and the switch 1626, and a second phase leg comprises the switch 1608 and the switch 1609. The terminals of these two phase legs are connected together as shown in FIG. 17. Furthermore, the switch 1625 and the switch 1608 share the same control signal. The switch 1626 and the switch 1609 also share the same control signal. These two phase legs can be combined. As a result, the second terminal of flying cap 1622 is connected directly to the common node of the switch 1608 and the switch 1609. Switches 1625 and 1626 can be saved as shown in FIG. 18. Similarly, the switch 1635 can be combined with the switch 1618, and the switch 1636 can be combined with switch 1619. As a result, the second terminal of flying cap 1612 is connected directly to the common node of the switch 1618 and the switch 1619 as shown in FIG. 18.

For the hybrid dual-phase step-up power conversion systems shown in FIGS. 5 and 13-18, it is understandable that with the same control scheme described above, the power conversion systems can be used as hybrid dual-phase step-down power conversion systems too. In this new configuration, the VOUT terminals may function as voltage inputs while the VIN terminals may function as voltage outputs. The voltage step-down conversion ratio is the inverse of the voltage step-up conversion ratios described above. For example, the power conversion system depicted in FIG. 5 will have a step-down conversion ratio of at least 4:1, between the voltage input at the VOUT terminal and the voltage output at the VIN terminal. Similarly, the power conversion system in FIG. 13 will have a step-down conversion ratio of at least 6:1, between the voltage input at the VOUT terminal and the voltage output at the VIN terminal.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hybrid dual-phase step-up power conversion system comprising:
a step-up converter apparatus comprising a first leg, a second leg, a first capacitor and a second capacitor, wherein the first capacitor and the second capacitor are cross-coupled between the first leg and the second leg, and wherein a first terminal of the first capacitor is connected to a common node of two switches of the first leg, and a second terminal of the first capacitor is connected to a common node of two switches of the second leg; and
a plurality of expansion circuits coupled to the step-up converter apparatus, wherein the plurality of expansion circuits is configured to increase a power conversion ratio of the hybrid dual-phase step-up power conversion system.

2. The hybrid dual-phase step-up power conversion system of claim 1, wherein:
the first leg comprises a first switch, a second switch and a third switch coupled in series between an output terminal of the hybrid dual-phase step-up power conversion system and ground;
the second leg comprises a fourth switch, a fifth switch and a sixth switch coupled in series between the output terminal of the hybrid dual-phase step-up power conversion system and ground;
the first capacitor is connected between a common node of the fourth switch and the fifth switch, and a node of the first leg;
the second capacitor is connected between a common node of the second switch and the third switch, and a node of the second leg;
a first inductor connected between an input terminal of the hybrid dual-phase step-up power conversion system, and the common node of the fifth switch and the sixth switch; and
a second inductor connected between the input terminal of the hybrid dual-phase step-up power conversion system, and the common node of the second switch and the third switch.

3. The hybrid dual-phase step-up power conversion system of claim 2, wherein:
a type I expansion circuit of the plurality of expansion circuits comprises:
a first expansion switch connected between a first terminal and a second terminal of the type I expansion circuit;
a second expansion switch and a third expansion switch connected in series between a third terminal of the type I expansion circuit and ground; and
a first expansion capacitor connected between the first terminal of the type I expansion circuit and a common node of the second expansion switch and the third expansion switch; and
a type II expansion circuit of the plurality of expansion circuits comprises:
a fourth expansion switch, a fifth expansion switch and a sixth expansion switch connected in series between a first terminal and a third terminal of the type II expansion circuit, and wherein a common node of the fourth expansion switch, and the fifth expansion switch is connected to a second terminal of the type II expansion circuit; and
a second expansion capacitor connected between the first terminal of the type II expansion circuit and a common node of the fifth expansion switch and the sixth expansion switch.

4. The hybrid dual-phase step-up power conversion system of claim 3, wherein the plurality of expansion circuits comprises a first type II expansion circuit and a second type II expansion circuit, and wherein:
the first type II expansion circuit has a first terminal connected to the first switch, a second terminal connected to a common node of the first capacitor and the second switch, and a third terminal connected to a common node of the first inductor and the first capacitor; and the second type II expansion circuit has a first terminal connected to the fourth switch, a second terminal connected to a common node of the second capacitor and the fifth switch, and a third terminal connected to a common node of the second inductor and the second capacitor.

5. The hybrid dual-phase step-up power conversion system of claim 3, wherein the plurality of expansion circuits comprises a first type II expansion circuit and second a type II expansion circuit, and wherein:
the first type II expansion circuit has a first terminal connected to the first switch, a second terminal connected to a common node of the first capacitor and the second switch, and a third terminal connected to ground; and
the second type II expansion circuit has a first terminal connected to the fourth switch, a second terminal connected to a common node of the second capacitor and the fifth switch, and a third terminal connected to ground.

6. The hybrid dual-phase step-up power conversion system of claim 3, wherein the plurality of expansion circuits comprises a first type II expansion circuit, a second type II expansion circuit, a third type II expansion circuit, and a fourth type II expansion circuit, and wherein:
the first type II expansion circuit has a first terminal connected to the first switch through the third type II expansion circuit, a second terminal connected to a common node of the first capacitor and the second switch, and a third terminal connected to a common node of the first inductor and the first capacitor;
the second type II expansion circuit has a first terminal connected to the fourth switch through the fourth type II expansion circuit, a second terminal connected to a common node of the second capacitor and the fifth switch, and a third terminal connected to a common node of the second inductor and the second capacitor;
the third type II expansion circuit has a first terminal connected to the first switch, a second terminal connected to the first terminal of the first type II expansion circuit, and a third terminal connected to a node of the first type II expansion circuit; and
the fourth type II expansion circuit has a first terminal connected to the fourth switch, a second terminal connected to the first terminal of the second type II expansion circuit, and a third terminal connected to a node of the second type II expansion circuit.

7. The hybrid dual-phase step-up power conversion system of claim 3, wherein the plurality of expansion circuits comprises a first type II expansion circuit, a second type II expansion circuit, a first type I expansion circuit, and a second type I expansion circuit, and wherein:
the first type II expansion circuit has a first terminal connected to the first switch through the first type I expansion circuit, a second terminal connected to a common node of the first capacitor and the second switch, and a third terminal connected to ground;
the second type II expansion circuit has a first terminal connected to the fourth switch through the second type I expansion circuit, a second terminal connected to a common node of the second capacitor and the fifth switch, and a third terminal connected to ground;
the first type I expansion circuit has a first terminal connected to the first switch, a second terminal connected to the first terminal of the first type II expansion circuit, and a third terminal connected to the second terminal of the first type II expansion circuit; and
the second type I expansion circuit has a first terminal connected to the fourth switch, a second terminal connected to the first terminal of the second type II expansion circuit, and a third terminal connected to the second terminal of the second type II expansion circuit.

8. The hybrid dual-phase step-up power conversion system of claim 3, wherein the plurality of expansion circuits comprises a first type II expansion circuit, a second type II expansion circuit, a first type I expansion circuit, and a second type I expansion circuit, and wherein:
the first type II expansion circuit has a first terminal connected to the first switch through the first type I expansion circuit, a second terminal connected to a common node of the first capacitor and the second switch, and a third terminal connected to ground;
the second type II expansion circuit has a first terminal connected to the fourth switch through the second type I expansion circuit, a second terminal connected to a common node of the second capacitor and the fifth switch, and a third terminal connected to ground;
the first type I expansion circuit has a first terminal connected to the first switch, a second terminal connected to the first terminal of the first type II expansion circuit, and a third terminal connected to a common node of the fifth switch and the second capacitor; and
the second type I expansion circuit has a first terminal connected to the fourth switch, a second terminal connected to the first terminal of the second type II expansion circuit, and a third terminal connected to a common node of the second switch and the first capacitor.

9. The hybrid dual-phase step-up power conversion system of claim 8, wherein:
a second expansion switch of the first type I expansion circuit and the fifth switch are combined into one switch;
a third expansion switch of the first type I expansion circuit and the sixth switch are combined into one switch;
a second expansion switch of the second type I expansion circuit and the second switch are combined into one switch; and
a third expansion switch of the second type I expansion circuit and the third switch are combined into one switch.

10. A system comprising:
a first switch, a portion of a first type II expansion circuit, a second switch and a third switch coupled in series between an output terminal of the system and ground;
a fourth switch, a portion of a second type II expansion circuit, a fifth switch and a sixth switch coupled in series between the output terminal of the system and ground;
a first capacitor is connected between a common node of the fourth switch and the fifth switch, and a common node of the second switch and the first type II expansion circuit;
a second capacitor is connected between a common node of the second switch and the third switch, and a common node of the fourth switch and the second type II expansion circuit;
a first inductor connected between an input terminal of the system and the common node of the fifth switch and the sixth switch; and a second inductor connected between the input terminal of the system and the common node of the second switch and the third switch.

11. The system of claim 10, wherein the first type II expansion circuit and the second type II expansion circuit share a same structure comprising:
   a fourth expansion switch, a fifth expansion switch and a sixth expansion switch connected in series between a first terminal and a third terminal, and wherein a common node of the fourth expansion switch, and the fifth expansion switch is connected to a second terminal; and
   a second expansion capacitor connected between the first terminal and a common node of the fifth expansion switch and the sixth expansion switch, and wherein:
      the first type II expansion circuit has a first terminal connected to the first switch, a second terminal connected to a common node of the first capacitor and the second switch, and a third terminal connected to a common node of the first inductor and the first capacitor; and
      the second type II expansion circuit has a first terminal connected to the fourth switch, a second terminal connected to a common node of the second capacitor and the fifth switch, and a third terminal connected to a common node of the second inductor and the second capacitor.

12. The system of claim 11, wherein:
   the first type II expansion circuit and the second type II expansion circuit are configured such that an output voltage of the system is at least six times greater than an input voltage of the system.

13. The system of claim 10, wherein the first type II expansion circuit and the second type II expansion circuit share a same structure comprising:
   a fourth expansion switch, a fifth expansion switch and a sixth expansion switch connected in series between a first terminal and a third terminal, and wherein a common node of the fourth expansion switch, and the fifth expansion switch is connected to a second terminal; and
   a second expansion capacitor connected between the first terminal and a common node of the fifth expansion switch and the sixth expansion switch, and wherein:
      the first type II expansion circuit has a first terminal connected to the first switch, a second terminal connected to a common node of the first capacitor and the second switch, and a third terminal connected to ground; and
      the second type II expansion circuit has a first terminal connected to the fourth switch, a second terminal connected to a common node of the second capacitor and the fifth switch, and a third terminal connected to ground.

14. The system of claim 13, wherein:
   the first type II expansion circuit and the second type II expansion circuit are configured such that an output voltage of the system is at least six times greater than an input voltage of the system.

15. The system of claim 10, further comprising a third type II expansion circuit and a fourth type II expansion circuit, wherein the first type II expansion circuit, the second type II expansion circuit, the third type II expansion circuit and the fourth type II expansion circuit share a same structure comprising:
   a fourth expansion switch, a fifth expansion switch and a sixth expansion switch connected in series between a first terminal and a third terminal, and wherein a common node of the fourth expansion switch, and the fifth expansion switch is connected to a second terminal; and
   a second expansion capacitor connected between the first terminal and a common node of the fifth expansion switch and the sixth expansion switch, and wherein:
      the first type II expansion circuit has a first terminal connected to the first switch through the third type II expansion circuit, a second terminal connected to a common node of the first capacitor and the second switch, and a third terminal connected to a common node of the first inductor and the first capacitor;
      the second type II expansion circuit has a first terminal connected to the fourth switch through the fourth type II expansion circuit, a second terminal connected to a common node of the second capacitor and the fifth switch, and a third terminal connected to a common node of the second inductor and the second capacitor;
      the third type II expansion circuit has a first terminal connected to the first switch, a second terminal connected to the first terminal of the first type II expansion circuit, and a third terminal connected to a node of the first type II expansion circuit; and
      the fourth type II expansion circuit has a first terminal connected to the fourth switch, a second terminal connected to the first terminal of the second type II expansion circuit, and a third terminal connected to a node of the second type II expansion circuit.

16. The system of claim 15, wherein:
   the first type II expansion circuit, the second type II expansion circuit, the third type II expansion circuit and the fourth type II expansion circuit are configured such that an output voltage of the system is at least eight times greater than an input voltage of the system.

17. The system of claim 10, further comprising a first type I expansion circuit and a second type I expansion circuit, wherein:
   the first type I expansion circuit and the second type I expansion circuit share a same structure comprising:
      a first expansion switch connected between a first terminal and a second terminal;
      a second expansion switch and a third expansion switch connected in series between a third terminal and ground; and
      a first expansion capacitor connected between the first terminal and a common node of the second expansion switch and the third expansion switch; and
   the first type II expansion circuit and the second type II expansion circuit share a same structure comprising:
      a fourth expansion switch, a fifth expansion switch and a sixth expansion switch connected in series between a first terminal and a third terminal, and wherein a common node of the fourth expansion switch, and the fifth expansion switch is connected to a second terminal; and
      a second expansion capacitor connected between the first terminal and a common node of the fifth expansion switch and the sixth expansion switch, and wherein:
         the first type II expansion circuit has a first terminal connected to the first switch through the first type I expansion circuit, a second terminal connected to a common node of the first capacitor and the second switch, and a third terminal connected to ground;

the second type II expansion circuit has a first terminal connected to the fourth switch through the second type I expansion circuit, a second terminal connected to a common node of the second capacitor and the fifth switch, and a third terminal connected to ground;

the first type I expansion circuit has a first terminal connected to the first switch, a second terminal connected to the first terminal of the first type II expansion circuit, and a third terminal connected to the second terminal of the first type II expansion circuit; and the second type I expansion circuit has a first terminal connected to the fourth switch, a second terminal connected to the first terminal of the second type II expansion circuit, and a third terminal connected to the second terminal of the second type II expansion circuit.

18. The system of claim 17, wherein:
the first type II expansion circuit, the second type II expansion circuit, the first type I expansion circuit and the second type I expansion circuit are configured such that an output voltage of the system is at least ten times greater than an input voltage of the system.

19. The system of claim 10, further comprising a first type I expansion circuit and a second type I expansion circuit, wherein:
the first type I expansion circuit and the second type I expansion circuit share a same structure comprising:
 a first expansion switch connected between a first terminal and a second terminal;
 a second expansion switch and a third expansion switch connected in series between a third terminal and ground; and
 a first expansion capacitor connected between the first terminal and a common node of the second expansion switch and the third expansion switch; and
the first type II expansion circuit and the second type II expansion circuit share a same structure comprising:
 a fourth expansion switch, a fifth expansion switch and a sixth expansion switch connected in series between a first terminal and a third terminal, and wherein a common node of the fourth expansion switch, and the fifth expansion switch is connected to a second terminal; and
 a second expansion capacitor connected between the first terminal and a common node of the fifth expansion switch and the sixth expansion switch, and wherein:
  the first type II expansion circuit has a first terminal connected to the first switch through the first type I expansion circuit, a second terminal connected to a common node of the first capacitor and the second switch, and a third terminal connected to ground;
  the second type II expansion circuit has a first terminal connected to the fourth switch through the second type I expansion circuit, a second terminal connected to a common node of the second capacitor and the fifth switch, and a third terminal connected to ground;
  the first type I expansion circuit has a first terminal connected to the first switch, a second terminal connected to the first terminal of the first type II expansion circuit, and a third terminal connected to a common node of the fifth switch and the second capacitor; and
  the second type I expansion circuit has a first terminal connected to the fourth switch, a second terminal connected to the first terminal of the second type II expansion circuit, and a third terminal connected to a common node of the second switch and the first capacitor.

20. The system of claim 19, wherein:
the first type II expansion circuit, the second type II expansion circuit, the first type I expansion circuit and the second type I expansion circuit are configured such that an output voltage of the system is at least eight times greater than an input voltage of the system.

21. The system of claim 10, wherein:
the system is configured as a dual-phase step-down power conversion system, and wherein the output terminal of the system is configured to be connected to a power supply, and the input terminal of the system is configured to be connected to a load.

* * * * *